US012632456B1

(12) United States Patent
Alagheband et al.

(10) Patent No.: US 12,632,456 B1
(45) Date of Patent: May 19, 2026

(54) EMBEDDING-BASED SEARCH ADJUSTMENT SYSTEM

(71) Applicant: Block, Inc., Oakland, CA (US)

(72) Inventors: Mohammadreza Alagheband, Oppegård (NO); Paul Chira, Oslo (NO); Altan Timullin Cabal Lombodorzh, Oslo (NO)

(73) Assignee: Block, Inc., Oakland, CA (US)

( * ) Notice: Subject to any disclaimer, the term of this patent is extended or adjusted under 35 U.S.C. 154(b) by 0 days.

(21) Appl. No.: 18/982,664

(22) Filed: Dec. 16, 2024

(51) Int. Cl.
| | |
|---|---|
| *G06F 16/00* | (2019.01) |
| *G06F 16/22* | (2019.01) |
| *G06F 16/2457* | (2019.01) |
| *G06F 16/248* | (2019.01) |

(52) U.S. Cl.
CPC ........ *G06F 16/24578* (2019.01); *G06F 16/22* (2019.01); *G06F 16/248* (2019.01)

(58) Field of Classification Search
CPC ... G06F 16/24578; G06F 16/22; G06F 16/248
See application file for complete search history.

(56) References Cited

U.S. PATENT DOCUMENTS

| | | | | |
|---|---|---|---|---|
| 10,579,688 | B2 * | 3/2020 | Green | G06Q 30/0251 |
| 11,341,523 | B1 * | 5/2022 | Jacoby | G06Q 20/3278 |
| 11,748,759 | B1 * | 9/2023 | Sardari | G06Q 20/20 |
| | | | | 705/44 |

| | | | | |
|---|---|---|---|---|
| 11,797,595 | B2 * | 10/2023 | Hartlaub | G06F 16/437 |
| 12,061,979 | B2 * | 8/2024 | Ordentlich | G06N 3/045 |
| 12,141,186 | B1 * | 11/2024 | Tomar | G06F 16/355 |
| 12,259,895 | B1 * | 3/2025 | Huang | G06F 16/24578 |
| 2016/0210321 | A1 * | 7/2016 | Gong | H04L 67/30 |
| 2019/0163768 | A1 * | 5/2019 | Gulati | G06F 16/56 |
| 2020/0380027 | A1 * | 12/2020 | Aggarwal | G06N 3/044 |
| 2020/0410546 | A1 * | 12/2020 | Arora | G06Q 30/0271 |
| 2021/0034684 | A1 * | 2/2021 | Iyer | G06N 3/044 |
| 2021/0174164 | A1 * | 6/2021 | Hsieh | G06N 3/044 |
| 2021/0200395 | A1 * | 7/2021 | Grue | G06F 16/587 |
| 2021/0365500 | A1 * | 11/2021 | Gunaselara | G06F 16/951 |
| 2022/0083614 | A1 * | 3/2022 | Ushanov | G06F 16/9535 |
| 2022/0156599 | A1 * | 5/2022 | Pai | G06F 18/22 |
| 2023/0152598 | A1 * | 5/2023 | Brebner | G02B 27/0977 |
| | | | | 359/627 |

(Continued)

*Primary Examiner* — Noosha Arjomandi
(74) *Attorney, Agent, or Firm* — IP Spring

(57) ABSTRACT

Embedding-based search adjustment system is described. In an example, a search system generates digital content embeddings based on digital content characteristics using machine learning and indexes these embeddings with respective identifiers according to an embedding schema based on the digital content characteristics. Upon receiving a search result containing references to multiple items in response to a search query, the search system generates a search result embedding for the referenced items using machine learning. The search system then performs a similarity search comparing the search result embedding against the digital content embeddings to generate affinity scores. User interaction data related to the items in the search result is obtained. Based on both the affinity scores and the user interaction data, the search system adjusts the items within the search result. The adjusted search result is then presented for display in a user interface.

20 Claims, 13 Drawing Sheets

(56)         References Cited

U.S. PATENT DOCUMENTS

| | | | |
|---|---|---|---|
| 2023/0185844 A1* | 6/2023 | Aggarwal | G06N 3/09 |
| | | | 706/11 |
| 2023/0245174 A1* | 8/2023 | Rajasekaran | G06Q 30/0631 |
| | | | 705/14.66 |
| 2024/0257214 A1* | 8/2024 | Vashishtha | G06Q 30/0631 |
| 2024/0273105 A1* | 8/2024 | Martigny | G06F 16/9535 |
| 2024/0273291 A1* | 8/2024 | Smith | G06F 40/56 |
| 2024/0296425 A1* | 9/2024 | Rosenkranz | G06F 40/197 |
| 2024/0320544 A1* | 9/2024 | Jain | G06N 20/00 |
| 2024/0378213 A1* | 11/2024 | Kumar | G06F 16/252 |
| 2024/0394945 A1* | 11/2024 | Orozco | G06V 10/70 |
| 2024/0403341 A1* | 12/2024 | Berglund | G06F 16/3326 |
| 2025/0005346 A1* | 1/2025 | Lo | H04L 67/535 |
| 2025/0045281 A1* | 2/2025 | Grappin | G06Q 30/0271 |
| 2025/0174300 A1* | 5/2025 | Goffinet | G16B 20/30 |
| 2025/0200115 A1* | 6/2025 | Chalkley | G06F 16/9538 |
| 2025/0245281 A1* | 7/2025 | Mehrdad | H04L 67/535 |
| 2025/0252111 A1* | 8/2025 | Aggarwal | G06F 16/24578 |
| 2025/0258868 A1* | 8/2025 | Panigrahi | G06N 20/00 |
| 2025/0328568 A1* | 10/2025 | Aggarwal | G06F 16/338 |
| 2025/0348497 A1* | 11/2025 | Cui | G06F 16/24578 |
| 2025/0348550 A1* | 11/2025 | So | G06F 16/9535 |
| 2025/0371601 A1* | 12/2025 | Bhattacharya | G06Q 30/0631 |
| 2025/0378355 A1* | 12/2025 | Morato | G06N 5/02 |

* cited by examiner

200

Search Query 124

Search Service 118

Search Engine 128

Machine-Learning Model 130

Initial Search Result 202

Embedding-Based Search Adjustment System 132

Indexer Module 204

Vector 206

ID 208

210

Embedding Schema 212

Artist 214

Track 216

Album 218

Entity 220

Playlist 222

Embedding Adjustment Module 224

Adjusted Search Result 126

300 —

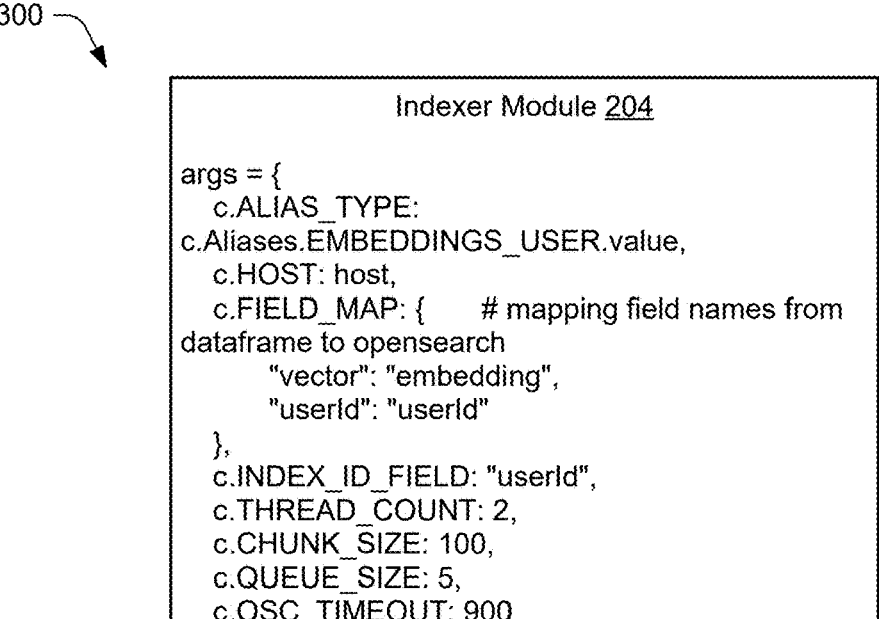

```
Indexer Module 204 args = {
    c.ALIAS_TYPE:
c.Aliases.EMBEDDINGS_USER.value,
    c.HOST: host,
    c.FIELD_MAP: {      # mapping field names from
dataframe to opensearch
        "vector": "embedding",
        "userId": "userId"
    },
    c.INDEX_ID_FIELD: "userId",
    c.THREAD_COUNT: 2,
    c.CHUNK_SIZE: 100,
    c.QUEUE_SIZE: 5,
    c.OSC_TIMEOUT: 900
}
```

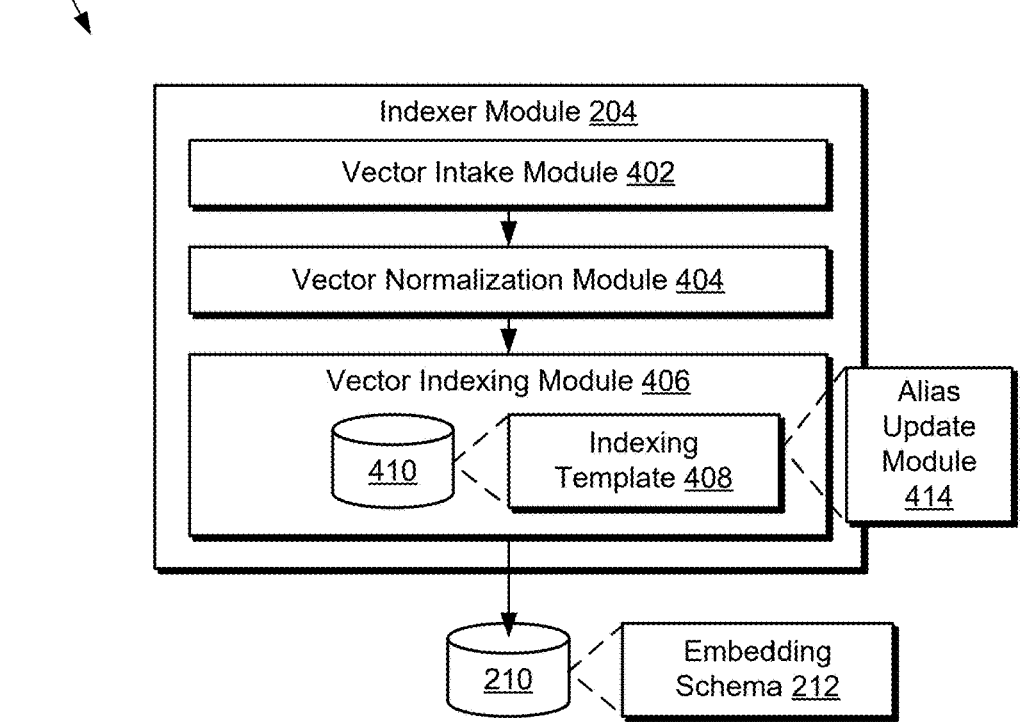

Indexer Module 204

Vector Intake Module 402

Vector Normalization Module 404

Vector Indexing Module 406

410        Indexing Template 408

Alias Update Module 414

210        Embedding Schema 212

$$Recency(x) = \begin{cases} 1 & 0 \leq x < 15 \\ 0.85 & 15 \leq x < 31 \\ 0.75 & 31 \leq x < 61 \\ 0.65 & 61 \leq x < 91 \\ 0.55 & 91 \leq x < 121 \\ 0.45 & 121 \leq x < 151 \\ 0.35 & 151 \leq x < 181 \\ 0.30 & 181 \leq x < 211 \\ 0.25 & 211 \leq x < 241 \\ 0.20 & 241 \leq x < 271 \\ 0.15 & 271 \leq x < 301 \\ 0.10 & 301 \leq x < 331 \\ 0.05 & 331 \leq x < 365 \\ 0.0 & x \leq 365 \end{cases}$$

$$Position(x) = \begin{cases} 1 & 1 \leq x < 6 \\ 0.9 & 6 \leq x < 11 \\ 0.7 & 11 \leq x < 21 \\ 0.4 & 21 \leq x < 31 \\ 0.3 & 31 \leq x < 41 \\ 0.2 & 41 \leq x < 51 \\ 0.0 & x \leq 51 \end{cases}$$

Fig. 6

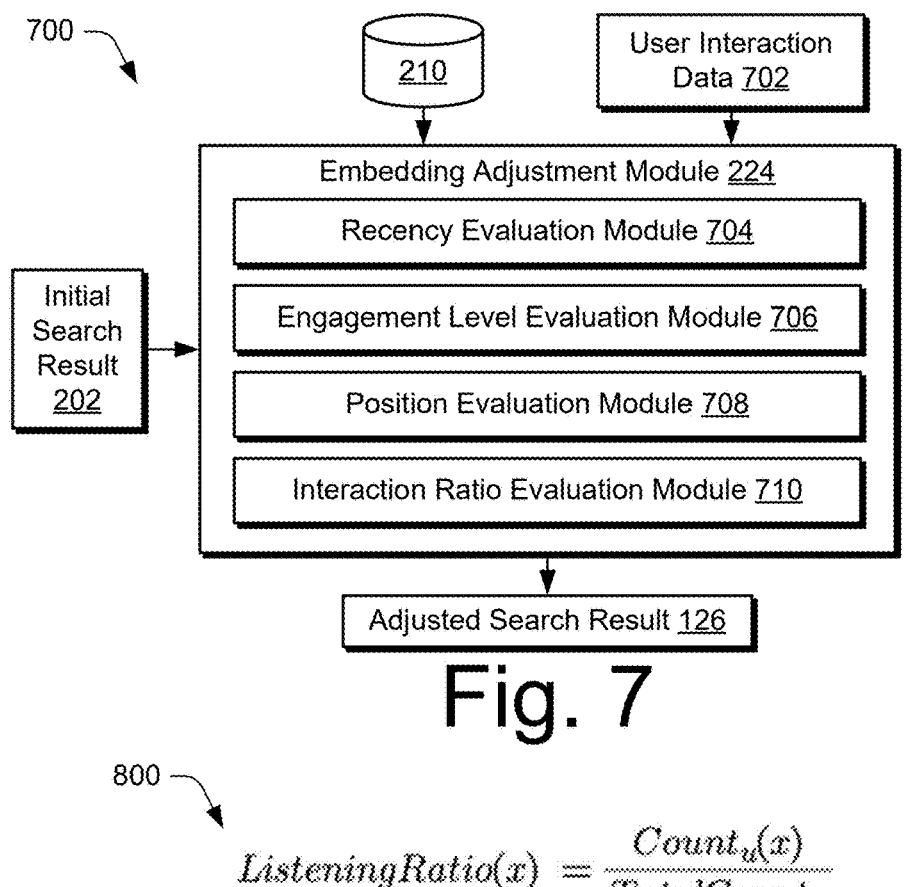

$$ListeningRatio(x) = \frac{Count_u(x)}{TotalCount_u}$$

$$Score\_dist_q(x) = Max\Big(Score_q(S)\Big) - Score_q(x)$$

$$Interest_q(x) = \Big[Score\_dist_q(x) \cdot Position_q(x) + \beta\Big] \times \Big(\sqrt{ListeningRatio_q(x)} + Recency_q(x)\Big)$$

$$Perso(x) = Score_q(x) + Interest(x)$$

$$Perso(x) = Score_q(x) + 2 \cdot \Big(\big(\lambda \cdot Interest(x)\big) + \big((1-\lambda) \cdot 10 \cdot Affinity(x)\big)\Big)$$

Fig. 10

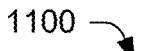

1100

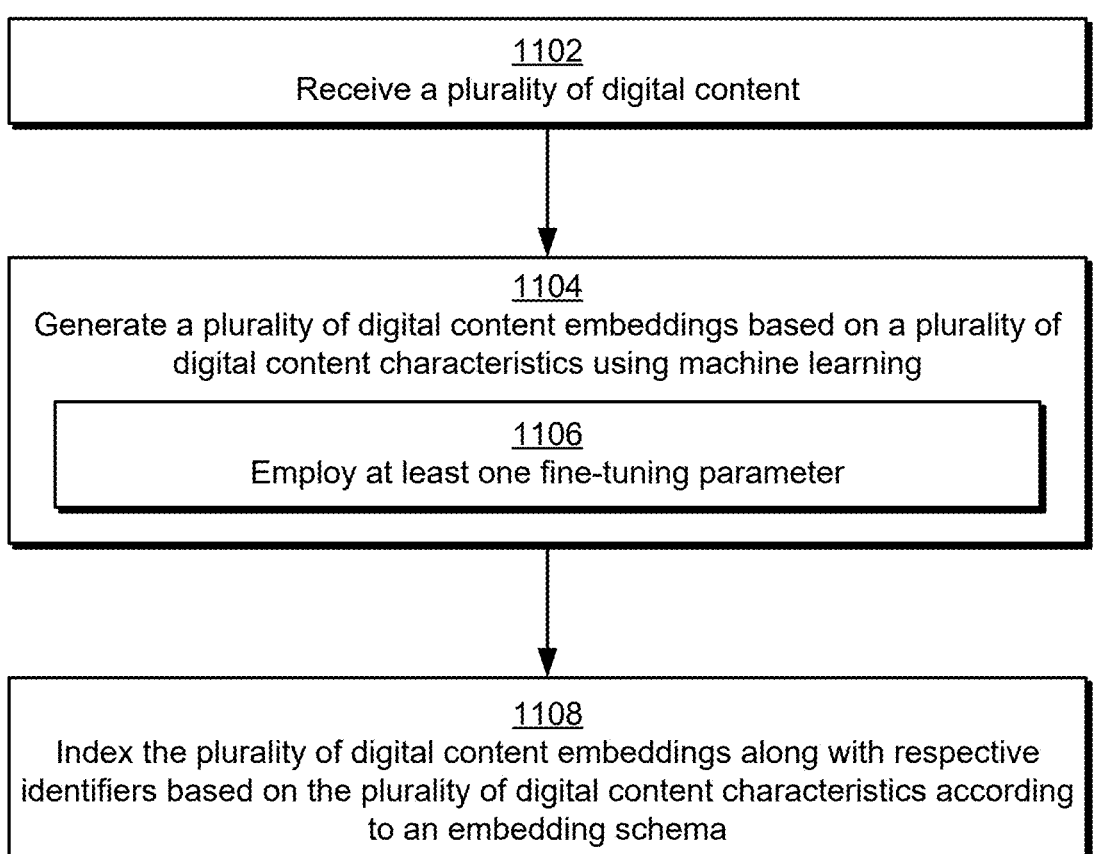

1102
Receive a plurality of digital content

1104
Generate a plurality of digital content embeddings based on a plurality of digital content characteristics using machine learning 1106
Employ at least one fine-tuning parameter 1108
Index the plurality of digital content embeddings along with respective identifiers based on the plurality of digital content characteristics according to an embedding schema

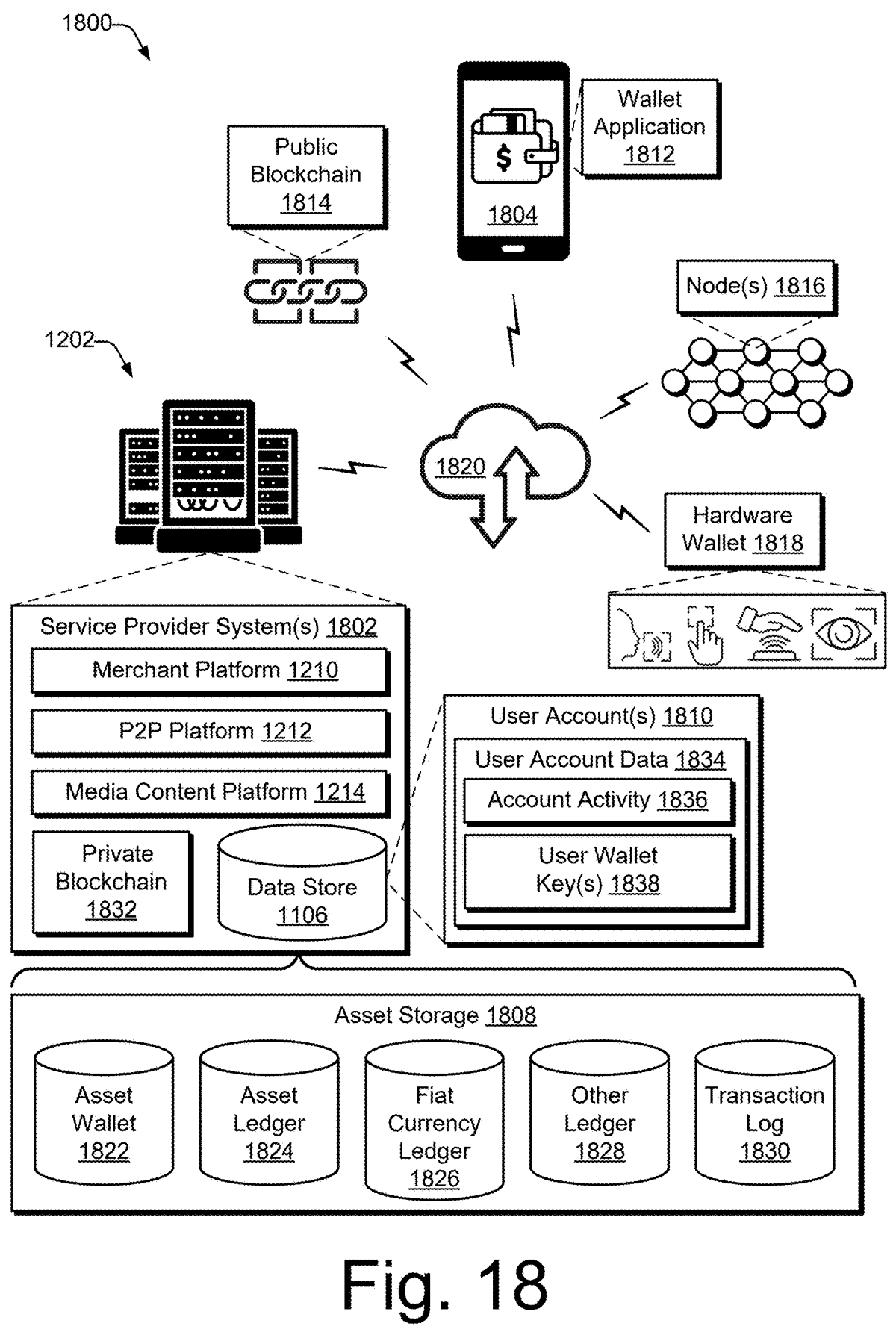

Public Blockchain 1814

Wallet Application 1812

1804

Node(s) 1816

1202

1820

Hardware Wallet 1818

Service Provider System(s) 1802

Merchant Platform 1210

P2P Platform 1212

Media Content Platform 1214

Private Blockchain 1832

Data Store 1106

User Account(s) 1810

User Account Data 1834

Account Activity 1836

User Wallet Key(s) 1838

Asset Storage 1808

Asset Wallet 1822

Asset Ledger 1824

Fiat Currency Ledger 1826

Other Ledger 1828

Transaction Log 1830

Fig. 18

1900 ⟍
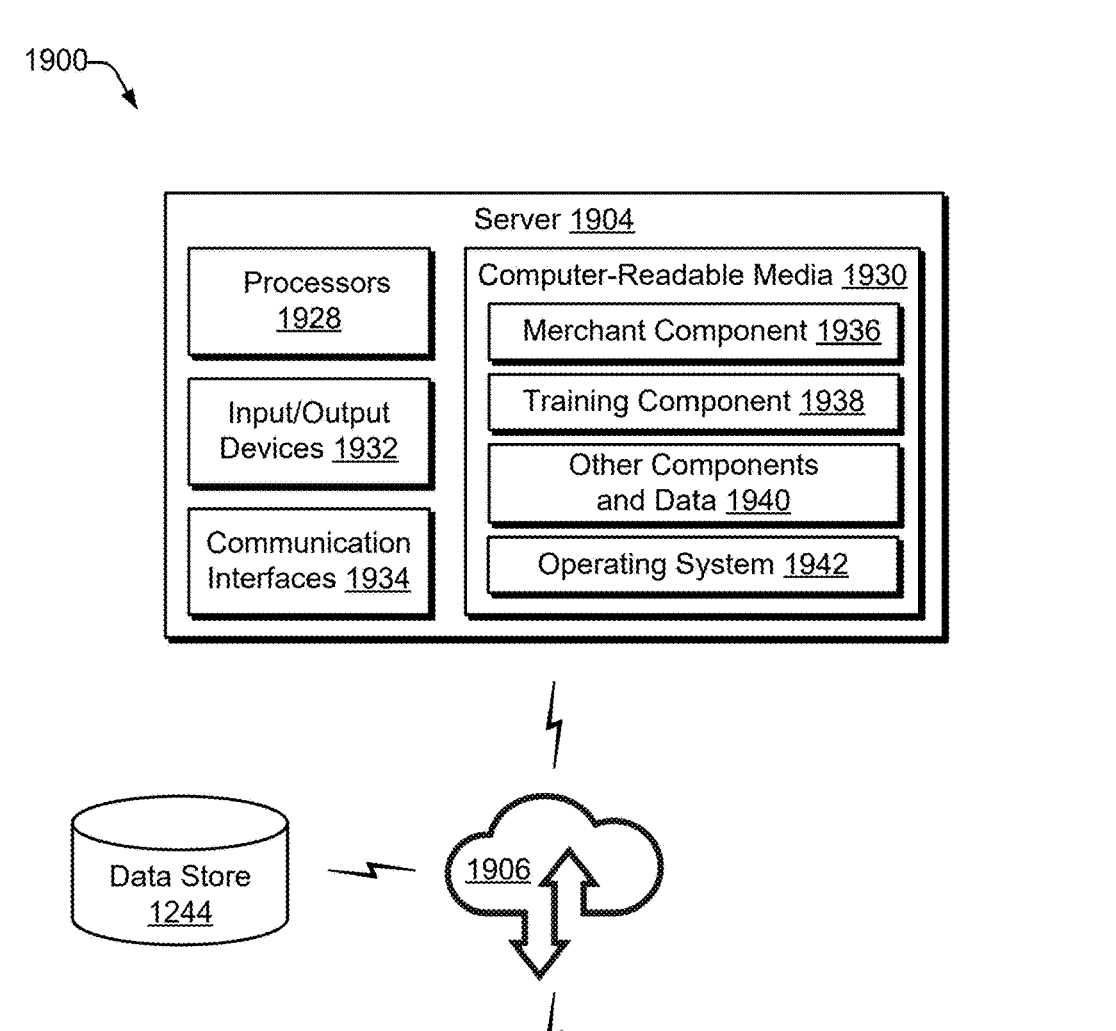
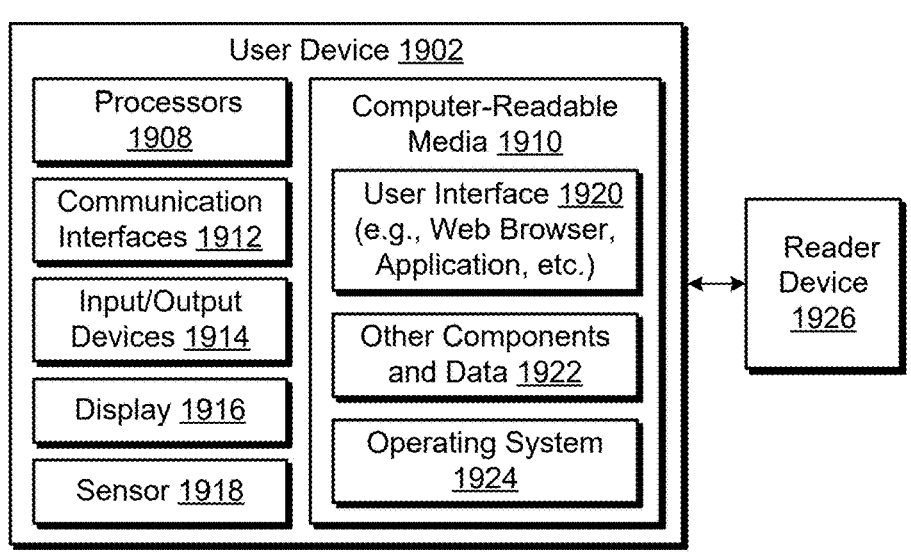
Fig. 19

EMBEDDING-BASED SEARCH ADJUSTMENT SYSTEM

TECHNICAL FIELD

Machine learning and other techniques have been developed to support searches of digital content. Conventional techniques that employ machine learning to do so, however, introduce numerous technical challenges and result in inefficient use of computational resources.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 3 depicts operations that are executable to employ parameters that are configurable as part of fine-tuning generation of embeddings by the indexer module of FIG. 2 in accordance with one or more implementations.

FIG. 4 is a block diagram depicting a non-limiting example of a system showing operation of an indexer module of an embedding-based search adjustment system of FIG. 2 in greater detail in accordance with one or more implementations.

FIG. 5 is a diagram depicting a non-limiting example of a recency piecewise linear function as executable by an embedding adjustment module of an embedding-based search adjustment system of FIG. 2 in greater detail in accordance with one or more implementations.

FIG. 6 is a diagram depicting a non-limiting example of a position piecewise linear function as executable by an embedding adjustment module of an embedding-based search adjustment system of FIG. 2 in greater detail in accordance with one or more implementations.

FIG. 7 is a block diagram depicting a non-limiting example of a system showing operation of the embedding adjustment module of an embedding-based search adjustment system of FIG. 2 in greater detail in accordance with one or more implementations.

FIG. 8 is a diagram depicting a non-limiting example of an interaction ratio equation as executable by an interaction ratio evaluation module of the embedding adjustment module of FIG. 7 in accordance with one or more implementations.

FIG. 9 is a diagram depicting a non-limiting example of a personalization formula as executable by the embedding adjustment module of FIG. 7 in accordance with one or more implementations.

FIG. 10 is a diagram depicting a non-limiting example of an extended personalization formula as executable by the embedding adjustment module of FIG. 7 in accordance with one or more implementations.

FIG. 11 is a flow diagram depicting a step-by-step procedure in an example implementation of operations performable by a processing device for accomplishing embedding generation and indexing using an embedding schema in accordance with one or more implementations.

FIG. 18 is a non-limiting example illustrating an environment in which search techniques described herein are performed in accordance with one or more implementations.

FIG. 19 is a non-limiting example illustrating an environment in which search techniques described herein are performed in accordance with one or more implementations.

DETAILED DESCRIPTION

Overview

Figure 1:
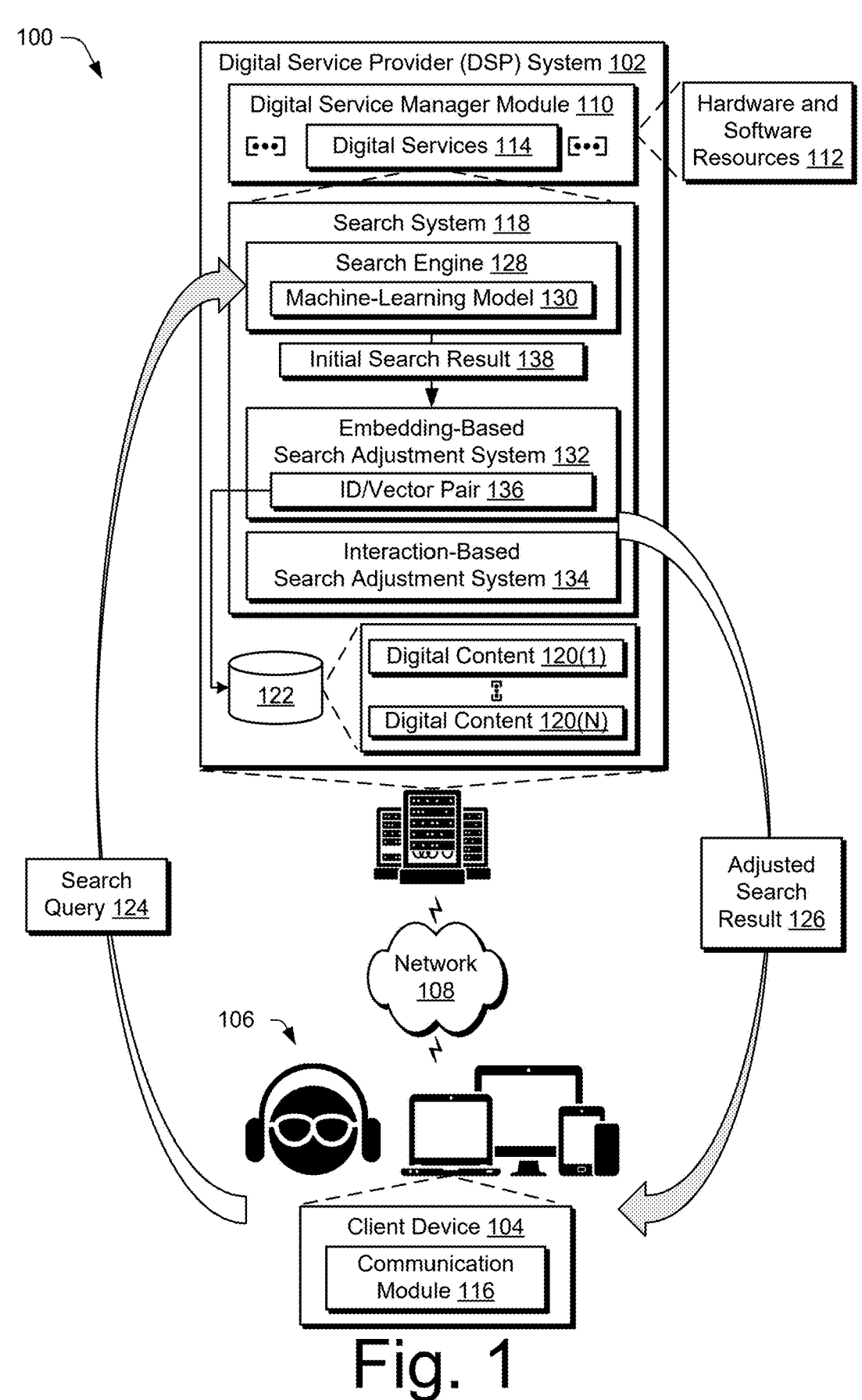
FIG. 1 is a block diagram depicting a non-limiting example of a system configured to implement search adjustment techniques in accordance with one or more implementations.

Conventional search systems face significant technical challenges in achieving a goal in enhancing a user experience related to digital content consumption. Conventional techniques, for instance, rely on top streaming preferences of a user and recent engagement data to enhance search results. However, these conventional techniques often fail in scenarios when limited to no user engagement data is available for a particular user, an artist, for "new" digital content, and so forth.

As a result, newly released digital content, digital content generated by less popular creators, or digital content with limited user engagement cannot be properly understood or recommended by conventional recommendation systems. In this way, conventional recommendation systems encounter numerous technical challenges referred to as a "cold start" problem. A cold start problem involves challenges regarding how to understand and recommend digital content that is not subject to an adequate number of user interactions to achieve an accurate result, "new" users that also have limited user interactions, and so forth. These technical challenges extend to a variety of digital content consumption domains, including e-commerce product recommendations, news article suggestions, artist collaboration recommendations, social media content curation, and so forth.

To address these and other technical challenges, techniques are described that support search through use of an embedding-based search adjustment system and an interaction-based search adjustment system. These systems are configurable to adjust search results based on a variety of factors to increase accuracy and are also usable to reduce computational resource consumption and increase efficiency.

In one or more examples involving the embedding-based search adjustment system, embeddings can be generated based on analysis of the media content itself (e.g., audio, visual, metadata, etc.) and formatted in a way that enables efficient comparison of the embeddings to a search input. Utilization of such embeddings as described herein enables search results tailored to a specific user account that input the search that is not possible with conventional techniques. For example, an indexer module is employed to generate digital content embeddings as a vector and associated identifier (ID) for respective items of digital content as a basis to select user interaction data to be used to adjust a search result. Fine-tuning parameters may also be employed as part of generating the digital content embeddings, examples of which include number of threads, size of data "chunks" to be processed at a time, queue size, and so forth. The digital content embeddings (e.g., vector and ID combinations) are then maintained in a storage device according to an embedding schema. The embedding schema, for instance, is usable to arrange the digital content embeddings based on artist, track, album, and user, to name a few examples. This process may be performed "offline" to conserve consumption of computational resources.

The digital content embeddings are then usable to adjust items in a search result. A search result, for instance, is received having a plurality of items that are "found" as a result of a search performed for a search query, e.g., references to items of digital content. A search result embedding is generated based on items included in the search result and then used to locate digital content embeddings. The search result embedding, for instance, is used as part of a similarity search (e.g., a nearest neighbor search) in the embedding space with respect to the digital content embeddings of the digital content for the user interaction data.

The similarity search is used as a basis to calculate affinity scores of the user for the items in the search result and adjust a ranking of the items in the search result accordingly. Adjustment of the items in the search result may be performed based on a variety of criteria as described in user interaction data with similar content items having sufficient interaction data for analysis, examples of user interaction data including engagement levels, a ratio based on a count of user interactions, and so forth. In this way, the embedding-based search system is configurable to adjust a search result to increase accuracy with respect to a particular user, further discussion of which may be found in relation to FIGS. 2-12.

In one or more examples involving the interaction-based search adjustment system, user interaction data is employed, directly, to adjust items in a search result. To do so, a log is maintained of search data that describes a plurality of previous search queries and corresponding search results. A search input is then received, e.g., as initiating input of a search query for use in an "autocomplete" scenario, the search query itself, and so on.

Candidate items are then obtained from the log that correspond to the search input. The candidate items, in one or more instances, are filtered based on availability at a digital service provider (DSP) system, e.g., whether respective items are currently available for streaming from a digital service provider (DSP) system, available for download, purchase, and so forth. The items in the search result are then adjusted based on user interaction data associated with the candidate items, e.g., a number of user interactions (e.g., "clicks"), conversions, and so forth.

In this way, the user interaction data overcomes conventional technical challenges involved in data sparsity and supports increased accuracy in generation of a suggestion, ordering of items in a search result, what items are included in the search result, and so forth. Additional items in the search result as initially received may be maintained, e.g., which do not correspond to the candidate items. In this way, the interaction-based search adjustment system is usable to support autocomplete of a search query (e.g., provide suggestions), adjust ranking within a search result, and so forth, further discussion of which may be found in relation to FIGS. 13-16.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Search Adjustment Environment

FIG. 1 is a block diagram depicting a non-limiting example of a system 100 configured to implement search adjustment techniques in accordance with one or more implementations. The system 100 includes a digital service provider (DSP) system 102 and a client device 104 associated with a user 106 that are communicatively coupled, one to another, via a network 108.

Computing devices that implement the digital service provider (DSP) system 102 and client device 104 are configurable in a variety of ways. Examples of computing device configurations include a server, a desktop computer, a laptop computer, a mobile device (e.g., assuming a handheld configuration such as a tablet or mobile phone), an IoT device, a wearable device (e.g., a smart watch), an augmented reality/virtual reality device, and so forth. For the digital service provider (DSP) system 102, for instance, clusters of graphics processing units (GPUs) are also contemplated, e.g., to accelerate implementation of artificial intelligence or other functionality. Thus, a computing device ranges from full resource devices with substantial memory and processor resources to low-resource devices with limited memory and/or processing resources. Although in instances in the following discussion reference is made to a computing device in the singular, a computing device may also represent any number of different computing devices, such as multiple servers of a server farm utilized to perform operations "over the cloud," e.g., as part of a media content platform.

The digital service provider (DSP) system 102 includes a digital service manager module 110 that is implemented using hardware and software resources 112 (e.g., a processing device and a non-transitory computer-readable storage medium) to implement digital services 114. Digital services 114 are representative of functionality made available via the network 108 to computing devices, such as the client device 104. The client device 104, for instance, executes a communication module 116 (e.g., configured as a browser, network-enabled application, and so forth) to access respective functionality of the digital services 114. Examples of digital services 114 include social media services, content streaming services, content creation services, peer-to-peer payment services, point-of-sale (POS) services, and so forth. A variety of other examples are also contemplated.

An additional example of a digital service is illustrated as a search system 118 that is configurable to implement search functionality, e.g., regarding digital content. The search system 118, for instance, is executable to locate one or more items of digital content 120(1), . . . , 120(N) (referred to collectively as digital content 120) maintained in a storage device 122, which may be accessible locally or remotely. A search query 124, for instance, is received by the search system 118 and processed to generate an adjusted search result 126. The adjusted search result 126 is configurable in a variety of ways, such as a suggestion for an "autocomplete" scenario, reference one or more items of digital content 120, inclusion in a playlist or other content suggestion or recommendation lists, and so forth as further described in relation to FIGS. 12 and 13.

Examples of digital content 120 include audio data such as music tracks, podcasts, audiobooks, visual data including digital images, photographs, artwork, video data ranging from short-form clips to full-length movies and TV series, textual data like articles, blog posts, and e-books, interactive media such as video games and virtual reality experiences, and hybrid content forms like digital magazines or interactive infographics. Examples of digital content 120 further include user and machine generated content (e.g., generative AI), content shared across social media platforms, educational materials, software applications, digital products (e.g., available for streaming), products, or other digital services available in e-commerce settings.

The search system 118 is configurable to implement search in a variety of ways. In the illustrated example, the search system 118 includes a search engine 128 that is implemented using at least one machine-learning model 130. The search engine 128 employs the machine learning model 130 to analyze intrinsic characteristics of the digital content itself, such as audio features for music tracks and videos having an audio component, visual elements for images and videos, sentiment and/or pattern analysis in text or audible language utterances, combinations of these examples, and other implementations. The machine-learning model 130, for instance, is usable to extract an encoding of at least a portion of digital content 120 as defined by an embedding space. By extracting meaningful representations directly from the digital content through use of the embeddings, the search engine 128 can understand and categorize digital content even in the absence of user engagement data. As a result, recommendations may be made for generated, unpopular, or other content that is unassociated with user interaction data, significantly expanding a scope of recommendable items of digital content within a catalog.

The encodings are configurable as mathematical representations that capture the features and attributes of the digital content 120. For digital audio, the encodings may represent tonal qualities, rhythm patterns, and genre characteristics, along with sentiment and other language analysis of spoken utterances in the digital audio. For digital visual content, encodings are configurable to capture color schemes, object compositions, and stylistic elements, among numerous examples.

To do so, the search query 124 and the digital content 120 are converted into a shared embedding space using a pre-trained neural network of the machine-learning model 130. This embedding space is a high-dimensional vector space where semantically similar queries and content are positioned closer together. The machine-learning model 130 leverages techniques such as word embeddings or sentence embeddings to capture the contextual meaning of the query and the content. Once both the query and the content are embedded, the search is performed using the search engine 128 by calculating the similarity between the search query vector and the digital content vectors, e.g., using cosine similarity or other distance metrics. Items of digital content 120(1)-120(N) with the highest similarity scores are then retrieved and ranked for inclusion in a search result. This approach allows for efficient and accurate retrieval of digital content 120 by leveraging the semantic relationships captured in the embedding space.

In some scenarios as previously described, however, conventional search systems encounter significant technical challenges when dealing with digital content that has minimal or no user interactions. The absence of behavioral data conventionally used to gauge content relevance and user preferences creates substantial difficulties. For instance, new or niche music tracks may receive little to no initial user engagement, leaving conventional collaborative filtering techniques unable to generate accurate recommendations. A newly released indie album might struggle to gain visibility in search results due to the lack of play counts, user ratings, or skip rates typically used to assess popularity and relevance. Similarly, content-based techniques face the cold-start problem, where insufficient information exists to accurately categorize or match content with user preferences. An up-and-coming podcast series, for example, may lack the historical data for use with conventional systems to properly classify its content or identify its target audience.

The sparsity of user interaction data for such digital content leads to challenges in feature extraction and representation learning, impacting similarity calculation accuracy. For instance, a newly uploaded video tutorial may not have enough views or likes for conventional systems to accurately determine its relevance to specific user queries. Conventional search systems also contend with potential biases towards popular content, as limited data for obscure items can lead to underrepresentation in recommendation algorithms. An experimental electronic music track, despite its potential appeal to certain users for instance, may be consistently outranked by mainstream hits in search results due to the lack of interaction data. Furthermore, the dynamic nature of digital content, with constant additions of new items, involves rapid adaptation by conventional systems to incorporate these items into the embedding space without the benefit of historical user data. This poses significant challenges for conventional techniques in an effort to effectively represent and recommend newly added e-books, for example, alongside well-established titles with extensive user interaction histories.

Accordingly, to address these and other technical challenges the search system 118 employs an embedding-based search adjustment system 132 and an interaction based search adjustment system 134. These systems are configurable to adjust search results based on a variety of factors to increase accuracy and are also usable to reduce computational resource consumption and increase computational efficiency. The search system 118, for instance, receives a search query 124 which is processed by the search engine 128 to generate an initial search result. The embedding-based search adjustment system 132 and/or the interaction based search adjustment system 134 are then employed to generate an adjusted search result 126 based on the initial search result 138 in a way the improves accuracy and computational resource efficiency.

The embedding-based search adjustment system 132, for instance, generates digital content embeddings as a vector and associated identifier (ID) for respective items of digital content. Fine-tuning parameters may also be employed as part of generating the digital content embeddings, examples of which include number of threads, size of data "chunks" to be processed at a time, queue size, and so forth. Consider a scenario in which a new item of digital content, such as a music track, is introduced into the embedding-based search adjustment system 132. The system begins by extracting various features from the audio file, including but not limited to spectral characteristics, rhythm patterns, and tonal properties. These features are then processed using a machine-learning model (e.g., a pre-trained neural network) to generate a high-dimensional vector representation of the audio file.

In parallel, metadata associated with the track, such as artist name, album title, genre, and release date, may be encoded into a separate vector. The embedding-based search adjustment system 132 may also incorporate user interaction data related to similar tracks or the artist's previous works, if available. Similar tracks, for instance, may be located based on a nearest-neighbor search in an embedding space of the track with other tracks of the artist. Examples of user interaction data include play counts, skip rates, user ratings, and so forth. The embedding-based search adjustment system 132 then combines these different vector representations (e.g., the audio-derived features, metadata encoding, and user interaction data) into a single, comprehensive embedding vector. This process may involve techniques such as concatenation, weighted averaging, or more sophisticated fusion methods, depending on the specific implementation.

As part of the embedding generation, the embedding-based search adjustment system 132 may apply the fine-tuning parameters as mentioned above. For instance, a "number of threads" parameter is usable to determine how many parallel processes are used to handle different aspects of the embedding generation. The size of data "chunks" parameter may control how the audio file is segmented for processing, potentially allowing for more efficient memory usage. The queue size parameter is usable to manage how many tracks are processed in a batch, which could impact both processing speed and resource allocation. Once the embedding vector is generated, the embedding vector is associated with a unique identifier (ID) for the track as an ID/vector 136 pair. This ID-vector pair 136 forms the digital content embedding, which is then ready for indexing and storage.

The digital content embeddings (e.g., vector and ID combinations) are maintained in a storage device according to an embedding schema. The embedding schema, for instance, is usable to arrange the digital content embeddings based on artist, track, album, and user. This organization allows for efficient retrieval and comparison of embeddings during search and recommendation processes. This process may be performed "offline" to conserve consumption of computational resources. By conducting this computationally intensive task outside of real-time user interactions, the embedding-based search adjustment system 132 maintains responsiveness while still leveraging the power of rich multidimensional representations for search functionality.

The digital content embeddings are then usable to adjust items in a search result. A search result, for instance, is received having a plurality of items that are "found" as a result of a search performed for a search query, e.g., references to items of digital content. A search result embedding is generated based on items included in the search result, e.g., for "found" items.

The search result embedding is then used as part of a similarity search (e.g., a nearest neighbor search) in the embedding space with respect to the digital content embeddings of the user interaction data to determine an amount of "affinity" between the embeddings as an affinity score. The similarity search, for instance, is used as a basis to calculate affinity scores of the user for the items in the search result and adjust a ranking of the items in the search result accordingly. Adjustment of the items in the search result may be performed based on a variety of criteria, examples of which include engagement levels, a ratio based on a count of user interactions, and so forth. In this way, the embedding-based search system is configurable to adjust a search result to increase accuracy with respect to a particular user account, further discussion of which may be found in relation to FIGS. 2-12.

In one or more examples involving the interaction-based search adjustment system, user interaction data is employed as part of search, e.g., autocomplete, adjusting a ranking of items in a search result, and so forth. To do so, a log is maintained of search data that describes a plurality of previous search queries and corresponding search results. This log may be generated by continuously recording user interactions with the search system. For instance, when a user account is used to enter a search query "pop music 2023," the system may log this query along with the search results presented to the user account, the items the user account clicked on, the duration of interaction with each item, and subsequent actions like streaming a song or adding it to a playlist. Over time, this log accumulates a corpus of data describing user behavior associated with one or more user accounts, devices, and so forth as well as preferences across various search scenarios.

A search input is then received, e.g., as initiating input of a search query for use in an "autocomplete" scenario, the search query itself, and so on. Candidate items are then obtained from the log that correspond to the search input. For example, if a user input is received of "pop m," the system may quickly reference the log to identify frequently searched queries beginning with those characters. The system might suggest "pop music 2023," "popular movie soundtracks," or "pop music artists" based on the frequency and recency of these queries in the log. The candidate items, in one or more instances, are filtered based on availability at a digital service provider (DSP) system, e.g., for streaming. In some cases, availability may be based on a jurisdiction or location associated with a device conducting the search, where different versions of particular items are available in different jurisdictions or locations. Alternatively, or additionally, availability of particular items may be based on access controls available to different tiers of user accounts, such as subscription tiers, detected engagement on the DSP system 102 (e.g., with a particular artist, genre, item, etc.), device type (e.g., whether a device that will play back a content item is configured for playback of lossless digital content), and so forth.

In another example, a ranking of items in a search result is adjusted based on user interaction data associated with the candidate items, e.g., a number of user interactions (e.g., "clicks"), conversions, and so forth. For example, if a search query is received for "pop music 2023," the system may initially return a list of relevant songs, albums, and playlists. However, the interaction-based search adjustment system 134 then refines this list based on the logged user interaction data. Songs that have been frequently played to completion by other user accounts who searched for similar terms, for instance, may be moved higher in the results. Conversely, items that are often skipped or have low engagement metrics may be demoted in one or more examples.

Additional items in the search result as initially received may be maintained, e.g., which do not correspond to the candidate items supplied based on the user interaction data. Persistence of the additional items promotes a balance between leveraging user interaction data and maintaining diversity in the search results, ensuring that potentially relevant but less interacted-with items are available for discovery. In this way, the interaction-based search adjustment system 134 is usable to support autocomplete of a search query (e.g., provide suggestions), adjust a ranking to form the adjusted search result 126, and so forth, further discussion of which may be found in relation to FIGS. 13-16.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Embedding-Based Search Adjustment

Figure 2:
FIG. 2 is a block diagram depicting a non-limiting example of a system showing operation of an embedding-based search adjustment system of the search service of FIG. 1 in greater detail in accordance with one or more implementations.

FIG. 2 is a block diagram depicting a non-limiting example of a system 200 showing operation of an embedding-based search adjustment system 132 of the search service of FIG. 1 in greater detail in accordance with one or more implementations. In this example, the embedding-based search adjustment system 132 is employed to leverage content embeddings in a manner to improve search accuracy, which may be leveraged in support of a variety of functionalities such as autocomplete, selection of items of digital content, ordering of items of digital content in a search result, and so forth.

In the illustrated example, the embedding-based search adjustment system 132 is configured to leverage embeddings, an example of which includes generation through an Alternating Least Squares (ALS) algorithm, which is a collaborative filtering technique that captures user account commonalities to make predictions. By utilizing these embeddings, DSP systems improve upon conventional personalization techniques that rely solely on user account streaming counts and engagement time. For example, this implementation supports personalized re-ranking of play-lists, artists and tracks in search results, increased accuracy in autocomplete suggestions, and so on thereby ultimately enhancing an overall user account experience in content discovery and consumption.

To do so, the search system 118 employs a search engine 128. The search engine 128 leverages a machine-learning model 130 to generate an initial search result 202. The embedding-based search adjustment system 132 then employs an architecture to generate the adjusted search result 126 based on the initial search result 202 through use of an indexer module 204 and an embedding adjustment module 222.

To begin in this example, a search query 124 is received by the search system 118. The search query may be a text input, a speech input, an audio input, an image input, a video input, or a combination of these or other input types. A machine-learning model 130, which has been trained on a corpus of data, processes the search query 124 and relevant items of digital content. For individual ones of the relevant items, the machine-learning model 130 generates a high-dimensional vector representation, or embedding, that captures the semantic meaning and contextual information of the search query 124. These embeddings may be formed as dense vectors of fixed dimensionality. The search engine 128 then utilizes these embeddings into the initial search result 202 based on comparison with digital content embeddings generated for digital content, e.g., as a nearest neighbor search performed using Cosine similarity. By leveraging these embeddings, for instance, the search engine 128 is configurable to locate corresponding items from a plurality of items of digital content based on "nearness" of the vectors in an embedding space.

The initial search result 202 is then passed to the embedding-based search adjustment system 132 to adjust the search result, e.g., based on user interaction data. An indexer module 204, for instance, is configurable to generate vectors 206 and corresponding identifiers (illustrated as "ID 208) for storage in a storage device 210.

As part of this, the indexer module 204 stores the vectors 206 (i.e., the embeddings) according to an embedding schema 212. The embedding schema 212, for instance, is configurable to organize the vectors 206 according to artist 214, track 216 (or other item of digital content), album 218 (or other collection of digital content), entity 220 (e.g., user account), playlist 222, and so forth. The embeddings (e.g., the vectors 206) and corresponding ID 208 are then accessible based on the embedding schema 212 from the storage device 210 by the embedding adjustment module 222 to generate the adjusted search result 126 to consider user interaction described as part of user interaction data.

FIG. 3 depicts operations 300 that are executable to employ parameters that are configurable as part of fine-tuning generation of embeddings by the indexer module 204 of FIG. 2 in accordance with one or more implementations. The indexer module 204 is configurable to employ the parameters to fine-tune performance of the indexer module 204 in generating the embeddings, i.e., the vectors 206. Illustrated examples of these parameters include "thread count," "chunk size," "queue size," a "timeout" value, and so forth.

The "thread count" refers to a number of threads to be processed at a point in time. The "chunk size" refers to an amount of data to be processed at that point in time and a "queue size" refers to a size of a queue used as part of generating the embedding. The "timeout" value ensures that operations performed by the indexer module 204 are completed within a specified time frame, thereby enhancing robustness and efficiency of the indexer module 204 in generating and indexing the vectors 206.

FIG. 4 is a block diagram depicting a non-limiting example of a system 400 showing operation of an indexer module 204 of an embedding-based search adjustment system 132 of FIG. 2 in greater detail in accordance with one or more implementations. Before indexing, the indexer module 204 employs a vector intake module 402 to input the vectors 206. The vectors 206 are then normalized by a vector normalization module 404. Through normalization, the vectors 206 ensure that when a dot product is calculated, resulting affinity scores are disposed within an expected range, e.g., between zero and one. Normalization also supports efficient calculations of cosine similarity and consistency, e.g., when ranking results based on the affinity scores.

The vectors 206, once normalized, are then passed to a vector indexing module 406 for storage as consistent with an embedding scheme 212. The vector indexing module 406, for instance, is configurable to employ one or more indexing templates 408, which are illustrated as maintained in a storage device 410. The indexing templates 408, in at least one example, correspond to the parameters defined for the embedding schema 212, such as artist 214, track 216, album 218, entity 220, playlist 222, and so forth. Accordingly, vectors 206 corresponding to a particular parameter are indexed according to the embedding schema 212 for that parameter in this example. Other examples are also contemplated, e.g., an indexing template 408 that addresses each of the parameters.

A variety of functions are usable to leverage user interaction data associated with respective items of digital content to enhance personalization in the adjusted search result 126. The functions, for instance, are usable by the embedding adjustment module 222 to control which items of digital content are included in the adjusted search result 126, a ranking of the items within the adjusted search result 126, use as a suggestion for autocomplete, and so forth.

FIG. 5 is a diagram depicting a non-limiting example of a recency piecewise linear function 500 as executable by an embedding adjustment module 222 of an embedding-based search adjustment system 132 of FIG. 2 in greater detail in accordance with one or more implementations. The piecewise linear function 500 is configurable to enhance personalization in adjustment of the initial search result 202 to generate the adjusted search result 126. FIG. 6 is a diagram depicting a non-limiting example of a position piecewise linear function 600 as executable by an embedding adjustment module 222 of an embedding-based search adjustment system 132 of FIG. 2 in greater detail in accordance with one or more implementations. The position piecewise linear function 600 is also configurable to enhance personalization in adjustment of positioning within the initial search result 202 to generate the adjusted search result 126. FIG. 7 is a block diagram depicting a non-limiting example of a system 700 showing operation of the embedding adjustment module 222 of an embedding-based search adjustment system 132 of FIG. 2 in greater detail in accordance with one or more implementations.

Referring now to FIG. 7, the embedding adjustment module 222 is configurable to leverage the vectors 206 stored in the storage device 210 as well as user interaction data 702 associated with the vectors to adjust the initial search result 202 to form the adjusted search result 126. The embedding adjustment module 222, for instance, locates vectors 206 (i.e., digital content vectors) from the storage device 210 as part of a search based on a search query embedding formed for the search query 124. The located vectors are then used to fetch corresponding user interaction data 702 to adjust the initial search result 202 using a variety of functionalities.

Illustrated examples of functionalities to do so are represented as a recency evaluation module 704, an engagement level evaluation module 706, a position evaluation module 708, and an interaction ratio evaluation module 710. The recency piecewise linear function 500 of FIG. 5 is usable by the recency evaluation module 704 to adjust the search result based on "how recent" interaction with respective items has occurred as described by the user interaction data.

The recency piecewise linear function 500 of FIG. 5 and the position piecewise linear function 600 of FIG. 6 are usable by the embedding adjustment module 222 to enhance personalization in adjustment of the initial search result 202 to generate the adjusted search result 126. As shown for the recency piecewise linear function 500 of FIG. 5, for instance, weights are assigned by the recency evaluation module 704 to different time periods based on a relative amount of significance. Likewise, for the position piecewise linear function 600 of FIG. 6, weights are assigned by the position evaluation module 708 to different item rankings based on a relative amount of significance.

Additional functions are also supported based on user interaction data, examples of which include engagement levels, a ratio based on a respective count of user interactions with a respective item of digital content and a total number of user interactions, and so forth. The engagement level evaluation module 706, for instance, is usable to quantify an amount of engagement observed through "clicks," conversion, and so forth. The interaction ratio evaluation module 710 is configurable to quantify an amount of user interaction with respect to particular items of digital content in comparison with the user interaction as a whole. These functions act to fine tune a degree of personalization applied to each item in the initial search result 202, e.g., to ensure that relevant digital content is prominently displayed in a user interface.

FIG. 8 is a diagram depicting a non-limiting example of an interaction ratio equation 800 as executable by an interaction ratio evaluation module 710 of the embedding adjustment module 222 of FIG. 7 in accordance with one or more implementations. A user account's interaction ratio for digital content, as represented in the illustrated equation as a "listening ratio," is calculated by dividing a count of a number of interactions for a specific item of digital content by a total number of interactions of each of the items digital content (e.g., of a similar type) accessed by a particular user account.

This ratio measures an amount of affinity a user account has towards the digital content. The ratio combines with recency and position factors in the personalization formula described below to adjust the digital content's score in the search results. The adjustment determines relative placement in the search results based on these factors, enabling the most relevant digital content to receive corresponding prominence in the results for both autocomplete and ranking scenarios.

FIG. 9 is a diagram depicting a non-limiting example of a personalization formula 900 as executable by the embedding adjustment module 222 of FIG. 7 in accordance with one or more implementations. The illustrated personalization formula 900 incorporates an original query score from the search engine, the computed interest, and a Beta variable for adjusting personalization influence. The square root of the interaction ratio enhances the contribution, as user accounts typically interact with numerous digital content items, which would otherwise result in a ratio that may be too minimal to meaningfully affect a final affinity score.

Affinity scores are calculated by the embedding adjustment module 222 using k-Nearest Neighbors (k-NN) based on search query embeddings compared against digital content vectors of digital content types including artists, tracks, and albums. These affinity scores are then usable as part of a personalization algorithm to adjust the search results as previously described. The enhancement enables digital content promotion through collaborative filtering. The affinity score quantifies user account similarity to other user accounts' preferences, refining personalization by incorporating both individual user account behavior and aggregate user account patterns. This collaborative filtering surfaces digital content likely to align with user account preferences, independent of prior direct interactions.

Following extraction of top candidates from the search engine, fields are extracted for post-filter implementation on the k-NN operation. In one or more examples, track groups are extracted for tracks, e.g., limited to a threshold number (e.g., top fifty) search engine results. Album identifiers and artist identifiers may also be extracted for albums and artists respectively. The extraction technique ensures acquisition of relevant affinity scores for implementation and expansion of the personalization algorithm in adjusting the search result.

FIG. 10 is a diagram depicting a non-limiting example of an extended personalization formula 1000 as executable by the embedding adjustment module 222 of FIG. 7 in accordance with one or more implementations. The extended personalization formula 1000 in this example leverages calculated affinity scores to expand a Perso(x) function by incorporating affinity scores as an additional signal. To do so, the extended personalization formula 1000 adjusts digital content (e.g., ranking) through a combination of interaction ratios, recency factors, position factors, and affinity scores derived from k-NN operations.

Parameters within the extended personalization formula 1000 include the following. "Perso (x)" represents a personalized score for an item of digital content "x," indicating a final adjusted affinity score after personalization. "Score_q (x)" is a base score for an item of digital content "x," derived from a search engine. The value "A" is a weighting factor that moderates a balance between the interest score and the affinity score in the final affinity score, with a range between zero and one, e.g., set to 0.5. "Interest(x)" reflects an amount of user account engagement or preference for digital content "x," influenced by the user account's interaction with similar digital content. "Affinity(x)" is an affinity measure for digital content "x," calculated using a k-Nearest Neighbors (k-NN) algorithm (e.g., ranging from zero to one) representing a collaborative similarity of the item of digital content "x" to other items, with which, other user accounts with similar preferences have interacted. This value is multiplied by "ten" in this example to adjust the range from [0,1] to [0, 10] to align with the values of "Interest(x)."

The formula enhances a base affinity score by integrating both the user account's affinity for the item of digital content and its collaborative affinity, weighted by "2." The multiplication of "Affinity(x)" by ten increases its impact, particularly when "A" is set lower, ensuring that collaborative recommendations have a substantial influence on the final ranking. In this way, the extended personalization formula 1000 dynamically balances personalization based on the user account's past behavior and the broader patterns observed across similar user accounts, resulting increase search result accuracy.

Two approaches are included in the following discussion as implemented by the embedding adjustment module 222 for calculating affinity scores for digital content items returned by the search engine. A first example includes executing k-NN on an index in total followed by post-filtering. A second example includes pre-filtering identifiers before applying the k-NN algorithm. Accordingly, the following discussion details both the post-filtering algorithm implementation and the enhanced pre-filtering approach in support reduced execution time and improved computational efficiency as compared with conventional techniques.

In the first example of a technique for enhanced personalization with post-filtering, the example begins by fetching candidate results from supported digital content types through a search engine. The technique extracts relevant identifiers from the retrieved results, specifically obtaining track groups for tracks, artist identifiers for artists, and master album identifiers for albums, to name a few examples. A user vector is then retrieved from a dedicated search engine index containing user embeddings. The k-Nearest Neighbors (k-NN) algorithm executes using the retrieved user embedding with a predefined parameter "k" to calculate affinity scores for the digital content items based on vector similarity measurements.

Following affinity score calculation, post-filtering operations filter the affinity scores to include (e.g., solely) digital content items retrieved from the initial search engine results. The embedding adjustment module 222 then applies the enhanced personalization formula 1000 from FIG. 10 to re-rank the digital content items. The re-ranking operation incorporates both the original search relevance and the calculated affinity scores to generate a final personalized ordering of the digital content items as the adjusted search result 126.

In the second example of a technique for enhanced personalization with pre-filtering, the example begins by executing k-NN operations by first defining specific identifier sets rather than processing each of the vectors. This technique improves computational efficiency by calculating affinity scores for candidate items derived from search results, focusing processing on relevant digital content.

This technique includes first defining specific identifier sets prior to k-NN algorithm implementation. The embedding adjustment module 222 retrieves candidate results from supported digital content types through a search engine, followed by extraction of relevant identifiers from the retrieved results. For tracks, the extraction obtains track groups; for artists, artist identifiers; and for albums, album identifiers. A user vector is retrieved (e.g., from storage device 210) containing user embeddings. Pre-filtering operations then utilize the extracted identifiers to constrain k-NN algorithm execution to the specified identifier set, focusing affinity score calculations on relevant items of digital content.

The k-Nearest Neighbors (k-NN) algorithm is executed by the embedding adjustment module 222 using the retrieved user embedding with a predefined parameter "k" to calculate affinity scores for the filtered digital content items based on vector similarity measurements. The calculated affinity scores are provided as inputs to a personalization service for processing, where the enhanced personalization formula 1000 of FIG. 10 re-ranks the digital content items. This pre-filtering technique optimizes computational efficiency through targeted affinity score calculations while maintaining personalization quality through collaborative filtering and user preference integration.

FIG. 11 is a flow diagram depicting a step-by-step procedure 1100 in an example implementation of operations performable by a processing device for accomplishing embedding generation and indexing using an embedding schema in accordance with one or more implementations. The following discussion describes techniques that are implementable utilizing the described systems and devices. Aspects of each of the procedures are implemented in hardware, firmware, software, or a combination thereof. The procedures are shown as a set of blocks that specify operations performable by hardware and are not necessarily limited to the orders shown for performing the operations by the respective blocks. Blocks of the procedures, for instance, specify operations programmable by hardware (e.g., processor, microprocessor, controller, firmware) as instructions thereby creating a special purpose machine for carrying out an algorithm as illustrated by the flow diagram. As a result, the instructions are storable on a computer-readable storage medium that causes the hardware to perform the algorithm.

To begin in this example, a plurality of digital content is received (block 1102). Examples of digital content include audio data such as music tracks, podcasts, and audiobooks, visual data including digital images, photographs, artwork, and video data ranging from short-form video clips to full-length movies and TV series. Additional examples of digital content include textual data such as articles, blog posts, and e-books, interactive media including video games and virtual reality experiences, hybrid content forms like digital magazines and FIG. 1 interactive infographics, user and machine generated content across social media platforms, educational materials, software applications, and digital products in e-commerce settings.

A plurality of digital content embeddings is generated based on a plurality of digital content characteristics using machine learning (block 1104). Embeddings may be generated by extracting various features from different types of digital content using machine learning techniques. For audio files such as music tracks, features may include spectral characteristics, rhythm patterns, and tonal properties. For visual content, embeddings may capture color schemes, object compositions, and stylistic elements. Metadata associated with the content, such as artist names, album titles, genres, and release dates may be encoded into separate vectors. The search system may also incorporate user interaction data such as play counts, skip rates, and user account ratings into the embedding generation. These different vector representations including content-derived features, metadata encoding, and user interaction data may then be combined into comprehensive embedding vectors through techniques such as concatenation, weighted averaging, or fusion methods. The resulting embeddings capture both intrinsic characteristics of the digital content and patterns of user account engagement.

As part of generating the digital content embeddings, at least one fine-tuning parameter is employed (block 1106). Fine-tuning parameters may be employed to optimize the embedding generation process. For instance, a "number of threads" parameter may control parallel processing by determining how many concurrent processes handle different aspects of embedding generation. When processing an audio file, a "chunk size" parameter may specify how the file is segmented, such as dividing a music track into thirty-second segments, allowing for efficient memory usage and processing. A "queue size" parameter may manage batch processing by controlling how many items are processed together, such as generating embeddings for groups of one-hundred tracks at a time. A "timeout" parameter may ensure embedding generation completes within specified time constraints, such as limiting processing to five minutes per item. These parameters may be adjusted based on available computational resources and performance requirements, e.g., increasing a number of threads on systems with more processing cores or reducing chunk sizes when memory is constrained.

The plurality of digital content embeddings are indexed along with respective identifiers based on the plurality of digital content characteristics according to an embedding schema (block 1108). Digital content embeddings may be organized and stored according to an embedding schema that enables efficient retrieval and comparison.

Embeddings for music content, for instance, may be indexed hierarchically based on artist, track, and album relationships such that artist embeddings may be stored with links to their associated track and album embeddings, while track embeddings may reference both a parent artist and album. The schema may also incorporate user vectors, allowing embeddings to be accessed based on user interaction patterns. When indexing a new music track, the embedding vector and unique identifier may be stored with pointers to the artist's embedding, the album embedding, and relevant user embeddings who have interacted with the track.

The schema may also employ indexing templates that define how different types of content are organized. Podcast episodes, for instance, may be indexed by show, episode number, and topic categories, while video content may be indexed by creator, series, genre, and length. This structured organization allows for rapid retrieval of related embeddings when performing similarity searches or generating recommendations.

Figure 12:
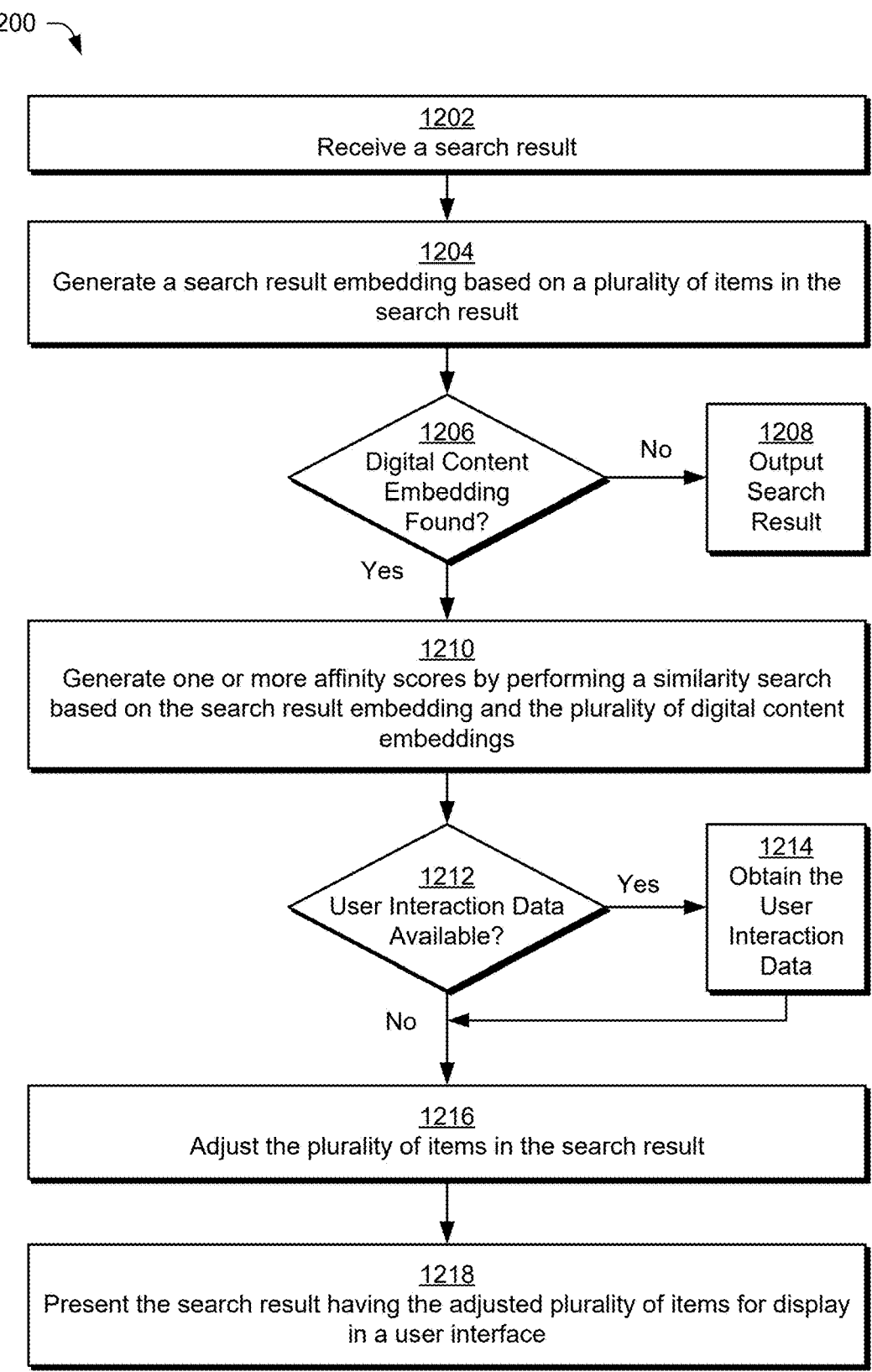
FIG. 12 is a flow diagram depicting a step-by-step procedure in an example implementation of operations performable by a processing device for accomplishing embedding-based search adjustment in accordance with one or more implementations.

FIG. 12 is a flow diagram depicting a step-by-step procedure 1200 in an example implementation of operations performable by a processing device for accomplishing embedding-based search adjustment in accordance with one or more implementations. The following discussion describes techniques that are implementable utilizing the described systems and devices. Aspects of each of the procedures are implemented in hardware, firmware, software, or a combination thereof. The procedures are shown as a set of blocks that specify operations performable by hardware and are not necessarily limited to the orders shown for performing the operations by the respective blocks. Blocks of the procedures, for instance, specify operations programmable by hardware (e.g., processor, microprocessor, controller, firmware) as instructions thereby creating a special purpose machine for carrying out an algorithm as illustrated by the flow diagram. As a result, the instructions are storable on a computer-readable storage medium that causes the hardware to perform the algorithm.

To begin in this example, a search result is received (block 1202), e.g., for a search performed responsive to a search query. A search result embedding is generated based on a plurality of items in the search result (block 1204). A search result embedding may be generated when a user account enters a search query such as "pop music 2023." The search engine first retrieves an initial set of results containing relevant music tracks, albums, and playlists. The search engine then processes these results using a pre-trained neural network to convert the search result into a shared embedding space as a high-dimensional vector representation that captures the semantic meaning and contextual information A determination is then made as to whether a digital content embedding is found (decision block 1206) based on the search result embedding. The determination, for instance, is usable to determine whether digital content embeddings are within a threshold distance in an embedding space and therefore exhibit at least a threshold amount of similarity. If not ("no" from decision block 1206), the search result is output (block 1208), e.g., without adjustment.

If so ("yes" from decision block 1206), one or more affinity scores are generated by performing a similarity search based on the search result embedding and the plurality of digital content embeddings (block 1210). Affinity scores may be generated by performing a k-Nearest Neighbors (k-NN) similarity search that compares the search result embedding against the stored digital content embeddings.

The similarity search evaluates the nearness or proximity between the vectors in the embedding space to determine how closely related different items are to each other. For example, when a search result embedding is generated from a query, the system may locate the closest digital content embeddings based on vector similarity measurements such as cosine similarity. The resulting affinity scores quantify the degree of similarity between the search result and each piece of digital content, with higher scores indicating greater relevance or similarity. These affinity scores may then be used in combination with user interaction data to adjust and refine the search results. The similarity search may be optimized through pre-filtering or post-filtering approaches, such as pre-filtering constrains the k-NN algorithm to a specific set of identifiers from the initial search results, while post-filtering calculates affinity scores for each of the items and then filters to include relevant search result items.

A determination is then made as to whether user interaction data is available, respectively, for the plurality of digital content embeddings (decision block 1212). If so ("yes" from decision block 1212), the user interaction data is obtained. If not ("no" from decision block 1212), the process continues without use of the user interaction data. In this example, the user interaction data is obtained for digital content items having at least a threshold amount of affinity with the search result based on the affinity scores.

The plurality of items in the search result are adjusted (block 1216), e.g., based on the one or more affinity scores and the user interaction data. A search result is then presented having the adjusted plurality of items for display in a user interface. The adjustment of items in the search result may incorporate both the calculated affinity scores and available user interaction data to enhance relevance and personalization. For example, items with high affinity scores based on embedding similarity and associated user interaction data may be promoted in the ranking, while items with low user engagement metrics may be demoted even for items with a relatively high amount of embedding similarity.

The adjustment process may consider multiple factors from the user interaction data, such as recency of interactions, position of items in previous search results, engagement levels like play counts or skip rates, and interaction ratios that compare individual item interactions against total user interactions. The personalization formula may combine these signals by weighting the initial search result 202, computed user interest, and affinity scores derived from embedding similarity. The adjusted search result 126 may then be formatted and presented in a user interface, with items reordered based on the combined scoring factors. The presentation may maintain additional items from the initial search results that did not match the candidate items to preserve diversity while still prioritizing relevant content based on the adjustment calculations.

In this way, embedding-based search adjustment provides several technical advantages in search result presentation and personalization. By combining affinity scores derived from embedding similarity with user interaction data, the system can more accurately determine content relevance beyond conventional engagement metrics alone. This approach helps address cold-start problems by enabling recommendations for new or niche content that lacks extensive user account interaction history. The adjustment process further improves computational efficiency through targeted similarity calculations and flexible filtering approaches. Search results may be dynamically reordered based on multiple signals including embedding similarity, interaction patterns, and engagement metrics, leading to more relevant and personalized content discovery. As a result, the embedding-based search adjustment system 132 maintains result diversity while promoting items having an increased likelihood of matching user account interests, enhancing an overall search experience through improved result ordering and presentation in a user interface.

Interaction-Based Search Adjustment

Figure 13:
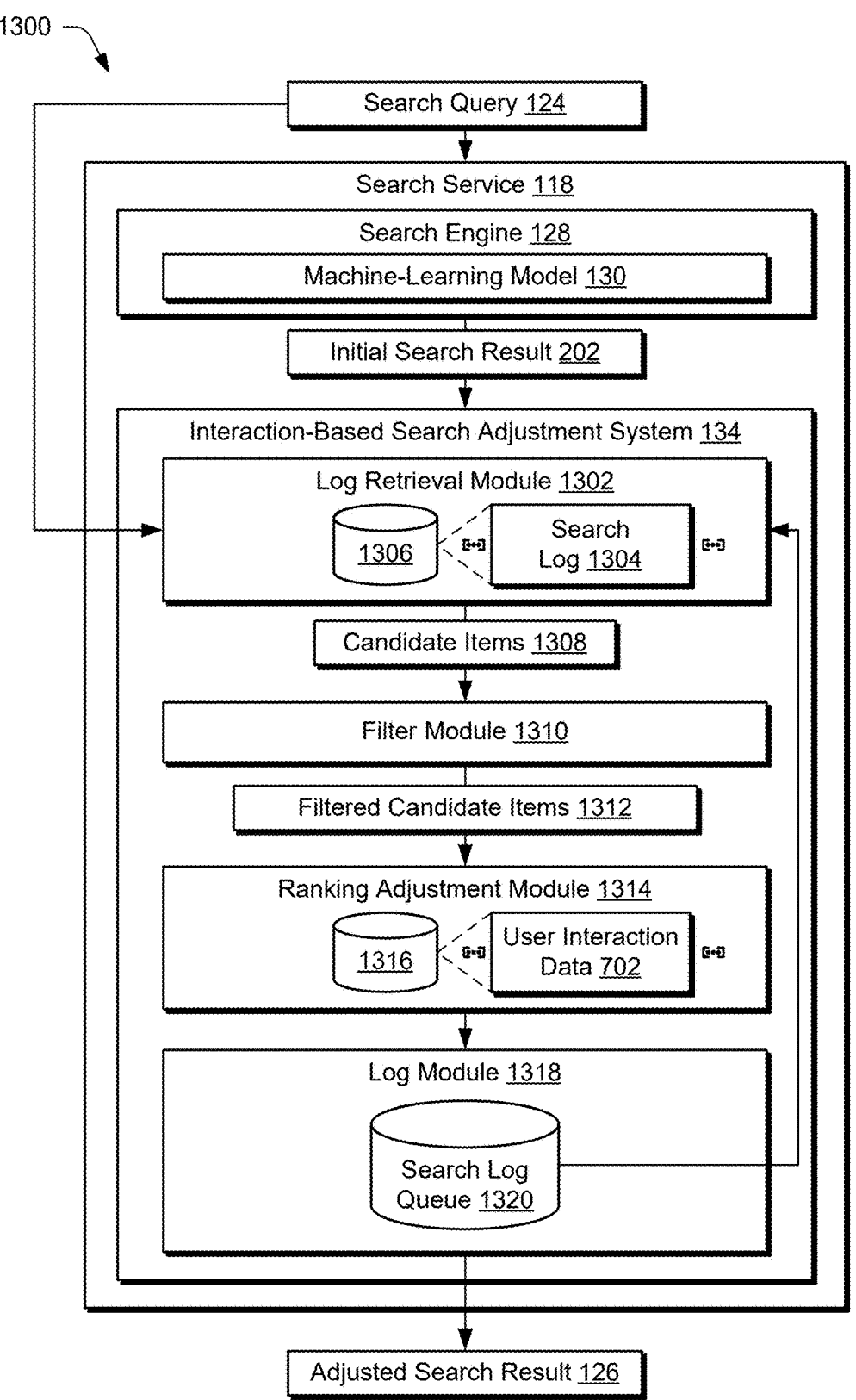
FIG. 13 is a block diagram depicting a non-limiting example of a system showing operation of an interaction-based search adjustment system of the search service of FIG. 1 in greater detail in accordance with one or more implementations.

FIG. 13 is a block diagram depicting a non-limiting example of a system 1300 showing operation of an interaction-based search adjustment system 134 of the search service of FIG. 1 in greater detail in accordance with one or more implementations. In this example, the interaction-based search adjustment system 134 is employed to leverage user interaction data in a manner to improve search accuracy, which may be leveraged in support of a variety of functionalities such as autocomplete, selection of items of digital content, ordering of items of digital content in a search result, and so forth.

Conventional digital content streaming platforms' search results do not utilize historical click data, which limits the ability to optimize search relevance effectively. While previous efforts have improved general search relevance, specific scenarios like genre-based queries still face a variety of technical challenges due to static ranking factors influenced by popularity.

In real-world scenarios, for instance, it has been observed that popular content types like artists and tracks are often prioritized in search results, which may not always align with user preferences, particularly for queries intended for different content types like albums, playlists and genres. For instance, artist-related queries tend to return multiple artists instead of focusing on a most relevant one, as in searches for a well-known pop artist where more than one artist is retrieved even when the intention is clear towards a single popular artist.

Accordingly, in this example the interaction-based search adjustment system 134 addresses these technical challenges by integrating user interaction data (e.g., historical click data) into search algorithms to dynamically adjust content type distribution and ranking based on real user account interactions. This technical solution improves computational efficiency by reducing a number of database queries and processing operations that would otherwise return irrelevant or duplicate results. The interaction-based search adjustment system 134 achieves enhanced search result accuracy by leveraging stored click data to identify and prioritize relevant content types for specific queries.

For example, when processing an artist-related query, the interaction-based search adjustment system 134 utilizes interaction data (e.g., "click data") to efficiently identify a relevant artist entity, thereby eliminating computational overhead of processing and ranking multiple less relevant artists. This targeted approach reduces server load and database operations while simultaneously improving search precision. The interaction-based search adjustment system 134 further optimizes resource utilization by maintaining a database of processed queries and their associated digital content interaction patterns, allowing for rapid retrieval of pre-computed relevance scores rather than performing real-time calculations for each search request.

The integration of click data also enables the interaction-based search adjustment system 134 to dynamically adjust search result rankings based on actual user account behavior patterns, reducing the computational resources previously spent on processing and ranking less relevant content types. This adaptive approach improves both computational resource efficiency and search accuracy by focusing computational resources on content types that the user interaction data indicates as having an increased likelihood of matching a user account's intent for specific query patterns.

Figure 14:
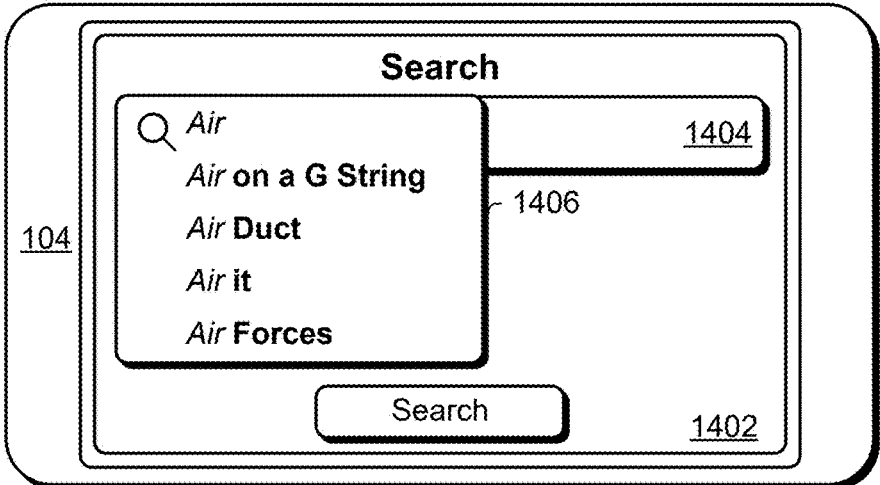
FIG. 14 is an illustration depicting a non-limiting example of user interface output as part of autocomplete functionality for a search query in accordance with one or more implementations.

To begin, similarly to FIG. 2, a search query 124 (e.g., as a search input) is received by the search system 118. The search query 124, for instance, as a search input is configurable as a portion of a search query that is used as a basis for an autocomplete. FIG. 14 is an illustration depicting a non-limiting example 1400 of user interface 1402 output as part of autocomplete functionality for a search query in accordance with one or more implementations. The user interface 1402 includes an input portion 1404 showing entry of a portion of a search query, e.g., "air." In response, a plurality of suggestions are output that are user selectable to initiate a search, which in the illustrated example bolded characters depict the suggestions.

Figure 15:
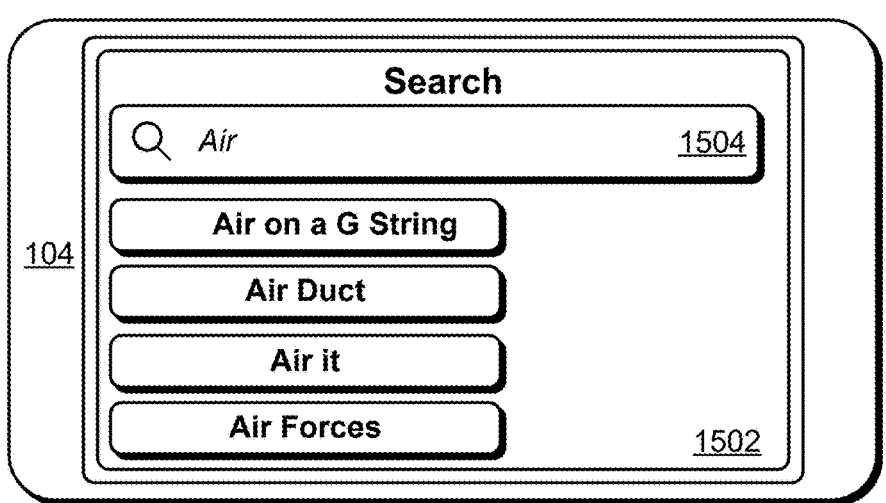
FIG. 15 is an illustration depicting a non-limiting example of user interface output as part of search ranking functionality for a search query in accordance with one or more implementations.

FIG. 15 is an illustration depicting a non-limiting example 1500 of user interface 1402 output as part of search ranking functionality for a search query in accordance with one or more implementations. In this example, the user interface 1502 also includes an input portion 1504 which includes a search query of "air." Representations are then displayed of items of digital content located responsive to a search performed using the search query, a ranking of which is adjusted using the techniques described herein. A variety of other examples are also contemplated.

Returning again to FIG. 13, a machine-learning model 130, which has been trained on a corpus of data, processes the search query 124 and relevant items of digital content. For each item, the machine-learning model 130 generates a high-dimensional vector representation, or embedding, that captures the semantic meaning and contextual information of the search query 124. These embeddings may be formed as dense vectors of fixed dimensionality. The search engine 128 then utilizes these embeddings as a basis to perform a search and generate the initial search result 202 based on comparison with digital content embeddings generated for digital content, e.g., as a nearest neighbor search performed using Cosine similarity. By leveraging these embeddings, for instance, the search engine 128 is configurable to locate corresponding items from a plurality of items of digital content based on "nearness" of the vectors in an embedding space.

The initial search result 202 is then passed to the interaction-based search adjustment system 134 to generate the adjusted search result 126. To do so, a log retrieval module 1302 is implemented to examine a search log 1304 maintained in a storage device 1306 to retrieve one or more candidate items 1308. The candidate items 1308 in this example are previous search queries and associated user interaction data that correspond to the search query 124, e.g., as found using a nearest neighbor search to locate the candidate items 1308. The log retrieval module 1302, for instance, may perform natural language processing, keyword search, specify an "exact match," and so forth.

The one or more candidate items 1308 are then filtered by a filter module 1310 to form a set of filtered candidate items 1312. The filter module 1310, for instance, is configurable to filter the one or more candidate items 1308 based on availability for streaming, as being accessible for download, available to the DSP system 102, and other instances of what it means to be "available for access."

The ranking adjustment module 1314 is then configurable to employ user interaction data 702 (maintained in a storage device) to rank the filtered candidate items 1312. The ranking adjustment module 1314 processes a set of filtered candidate items 1312, in one or more examples, by applying a time-based decay factor to user interaction data, e.g., historical click data. For instance, when processing a query, the ranking adjustment module 1314 retrieves stored interaction data (e.g., click counts) to individual ones of the candidate items and applies a half-life decay calculation (e.g., fifteen days) to weight recent interactions more heavily than older ones. The ranking adjustment module 1314 then calculates a final ranking score for each candidate by multiplying the initial weight (1.0) by 0.5 raised to the power of (age_from_now_days/half_life).

If a music track received one hundred clicks fifteen days ago, its weighted score would be "100 (0.5^(15/15))=50," while a track with eighty clicks from today would maintain its full weight of "80." The ranking adjustment module 1314 then sorts candidates based on these weighted scores, placing higher-weighted items at the top of the search results. This time-decay approach ensures search rankings remain fresh and relevant while still accounting for historical user interaction patterns. The system further refines these rankings by deduplicating results before presenting the final ordered list to user accounts, ensuring optimal computational efficiency while maintaining result relevance. In this way, a weighting to the filtered candidate items is adjusted based on the ranking adjustment generated by the ranking adjustment module 1314.

A log module 1318 is employed in this example to maintain a search log queue 1320 of these interactions, which may then be used to update the search log 1304 used by the log retrieval module 1302 for subsequent iterations. The log module 1318, for instance, is configurable to update the search log 1304 at predefined intervals, e.g., an amount of time, number of searches processed, and so forth. The search system 118 is also configurable to employ a variety of safeguards against malicious parties, e.g., by restricting events from free trial subscriptions, address frequency of user account interactions, exclude certain types of digital content, and so forth. In this way, the interaction-based search adjustment system 134 supports a variety of usage scenarios.

In a first example, an input of a search query 124 is processed to generate the adjusted search result 126 as having references to a plurality of items of digital content. To do so in this example, an interaction-based search adjustment system 134 receives search queries 124 through a search service interface. The system processes individual queries by accessing a database containing previously processed queries and their associated interaction data, e.g., through use of the log retrieval module 1302.

Upon receiving a query that matches an entry in the database, the interaction-based search adjustment system retrieves a corresponding list of candidate items 1308. The interaction-based search adjustment system 134 filters these one or more candidate items 1308 through an availability verification service and applies relevance-based adjustment based on stored user interaction data. The interaction-based search adjustment system 134 then constructs a results section by organizing candidates according to their click-based relevance scores, supplementing remaining positions with additional relevant items from a search index.

For queries without database matches, the interaction-based search adjustment system 134 processes the search request through standard relevance criteria, ensuring continuous operation even for previously unencountered queries. The interaction-based search adjustment system 134 displays the processed results to user accounts through an interface designed for user interaction.

The interaction-based search adjustment system 134 maintains result quality by capturing and storing user interaction data as part of the search log 1304 as user accounts engage with search results. This data includes details such as selected items, interaction types, and temporal information, creating a comprehensive record of user account behavior patterns.

Through operations performed at defined intervals, the interaction-based search adjustment system 134 updates the search log 1304 with newly collected interaction data. This regular refresh ensures the interaction-based search adjustment system 134 maintains current user account preference data while applying appropriate time-decay factors to historical interactions. The interaction-based search adjustment system 134 continues this cycle with each subsequent query, continuously improving search result relevance through accumulated interaction data.

In a second example in which the search input is a portion of a search query and the adjusted search result 126 is a list of suggestions based on the portion, the interaction-based search adjustment system 134 proceeds as follows. An interaction-based search adjustment system 134, for instance, receives search queries from user accounts through a search service interface. The system processes individual queries by accessing a database containing previously processed queries and their associated interaction data, attempting to match the current query as a prefix against stored entries as previously described.

When the interaction-based search adjustment system 134 identifies a matching query in the database, it retrieves a corresponding list of suggestions through use of the log retrieval module 1302. The interaction-based search adjustment system 134 is also configurable to generate an additional set of suggestions through standard search algorithms. These two sets of suggestions undergo a merging process where database-retrieved suggestions receive priority placement at the top of the combined list. The system performs deduplication on the merged suggestions to ensure result uniqueness.

For queries without database matches, the interaction-based search adjustment system 136 processes the search request through standard suggestion algorithms, ensuring continuous operation even for previously unencountered queries. The system displays the processed suggestions to user accounts through an interface designed for user interaction.

The interaction-based search adjustment system 136, as before, maintains suggestion quality by capturing and storing user interaction data as user accounts engage with displayed suggestions. This data includes details such as selected suggestions, interaction types, and temporal information, creating a comprehensive record of user account behavior patterns.

Through scheduled operations, the interaction-based search adjustment system 136 updates the search log 1304 with newly collected interaction data. This regular refresh ensures the system maintains current user preference data while applying appropriate time-decay factors to historical interactions. The system continues this cycle with each new query, continuously improving suggestion relevance through accumulated interaction data.

In a third example of scheduled interaction event processing, the interaction-based search adjustment system 136 processes interaction events at defined intervals (e.g., daily, hourly, weekly, and so forth) through a defined sequence of operations. The interaction-based search adjustment system 136 utilizes input parameters including a list of events, corresponding to a current time interval a half-life value determining data decay rates, and persistent storage for data retention. The system produces updated interaction data that incorporates both time-decay calculations and current interval interactions.

The interaction-based search adjustment system 136, in one or more examples, initializes operational variables including a half-life parameter, an initial weight value of 1.0, and a calculated decay factor derived from these values. These parameters enable the interaction-based search adjustment system 136 to weight recent interactions more heavily than older ones, ensuring search results remain temporally relevant while maintaining historical significance.

During initial operation in one or more instances, the interaction-based search adjustment system 136 processes a defined interval (e.g., thirty days) of historical events. The interaction-based search adjustment system 136 calculates interaction counts for respective days, applying a weight formula that combines the initial weight with an exponential decay based on the age of interactions. These weighted counts are summed to establish baseline interaction metrics, which the interaction-based search adjustment system 136 stores with temporal tags for future reference.

For subsequent operations, the interaction-based search adjustment system 136 retrieves previously processed data from storage and applies the calculated decay factor. This decay application reduces the influence of older interactions according to the established half-life parameter. The system then processes current day interactions, calculating total counts for new events. The interaction-based search adjustment system 136 combines the decay-adjusted historical data with totals for a current interval to create updated interaction metrics. These final calculations are stored back into the system's persistent storage, tagged with current temporal identifiers. This continuous processing cycle ensures that the interaction-based search adjustment system 136 maintains current, temporally weighted interaction data for improving search result relevance.

Figure 16:
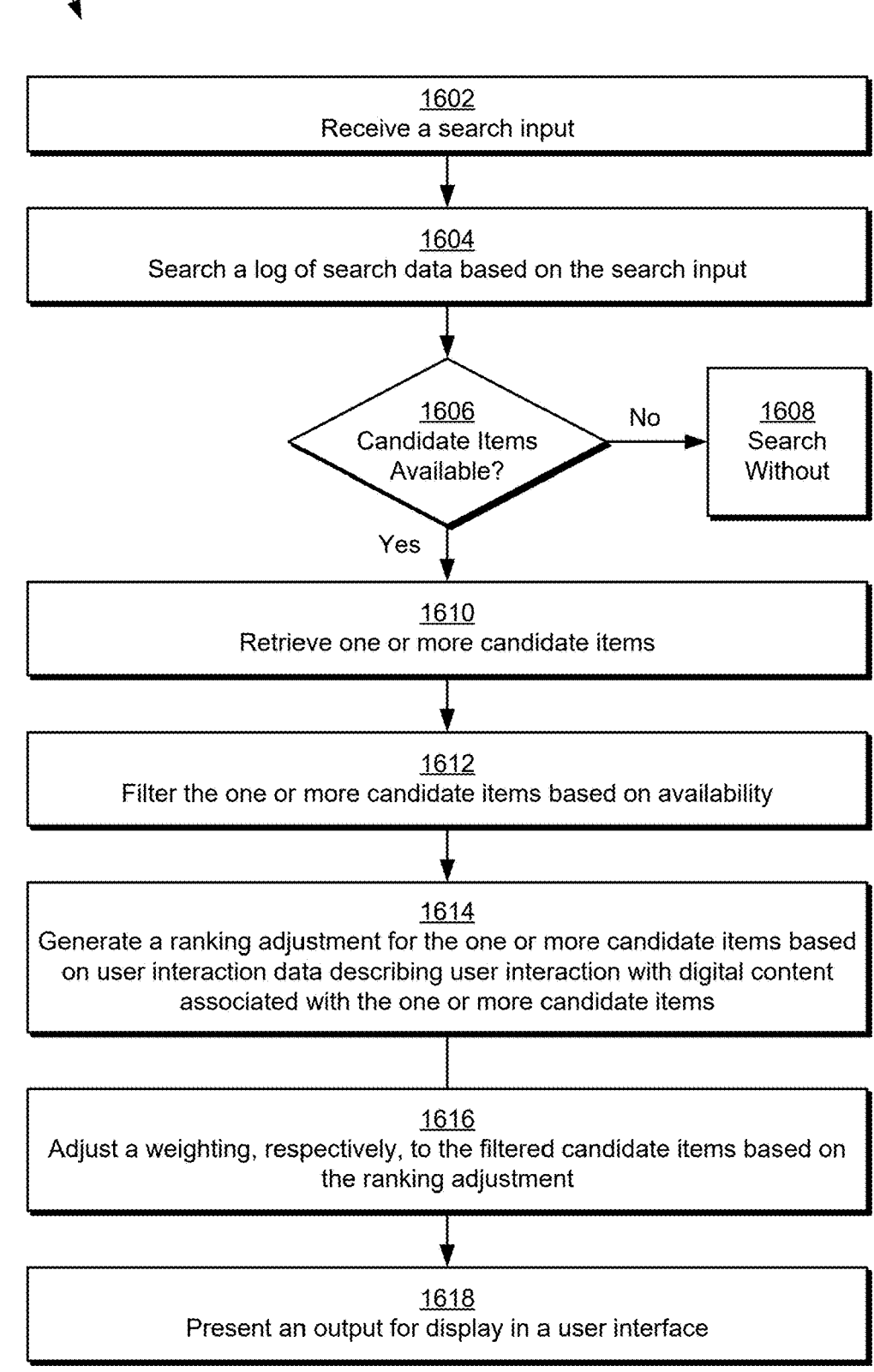
FIG. 16 is a flow diagram depicting a step-by-step procedure in an example implementation of operations performable by a processing device for accomplishing interaction-based search adjustment in accordance with one or more implementations.

FIG. 16 is a flow diagram depicting a step-by-step procedure 1600 in an example implementation of operations performable by a processing device for accomplishing interaction-based search adjustment in accordance with one or more implementations. The following discussion describes techniques that are implementable utilizing the described systems and devices. Aspects of each of the procedures are implemented in hardware, firmware, software, or a combination thereof. The procedures are shown as a set of blocks that specify operations performable by hardware and are not necessarily limited to the orders shown for performing the operations by the respective blocks. Blocks of the procedures, for instance, specify operations programmable by hardware (e.g., processor, microprocessor, controller, firmware) as instructions thereby creating a special purpose machine for carrying out an algorithm as illustrated by the flow diagram. As a result, the instructions are storable on a computer-readable storage medium that causes the hardware to perform the algorithm.

To begin in this example, a search input is received (block 1602). The search system receives a search input through a search service interface. The search input includes a portion of a search query for use in an autocomplete scenario or includes the search query itself. For example, the search input may be received as "pop m" or "pop music" through an input portion of a user interface displayed on a client device. The search input is processed by a machine learning model to generate a vector representation that captures semantic meaning and contextual information of the search input.

A log of search data is then searched based on the search input (block 1604). The search system accesses a database containing previously processed queries and corresponding interaction data to locate matching entries based on the search input. The database maintains thirty days of historical search events including details such as selected items, interaction types, and temporal information creating a comprehensive record of user behavior patterns. For example, when a search input of "pop m" is received, the search system examines the database to identify stored queries beginning with those characters along with associated user interaction metrics such as click counts, conversion rates, and engagement levels. The matching may be performed through natural language processing, keyword matching, or prefix-based comparison techniques to retrieve relevant historical search data.

A determination is then made as to whether one or more candidate items are available (decision block 1606). If not ("no" from decision block 1606), the search is performed without the candidate items. If so ("yes" from decision block 1606), one or more candidate items are retrieved (block 1610). The search system determines whether candidate items corresponding to the search input are found in the search log. For instance, when a search input of "electronic mu" is received, the search system examines the search log to identify stored queries and associated interaction data matching the search input prefix. When no matching candidate items are located in the search log, the search system processes the search input through standard search algorithms without incorporating historical interaction data. When matching candidate items are identified, the search system retrieves the candidate items from the search log along with corresponding user interaction metrics such as click counts, engagement levels, and temporal data for use in adjusting search results or generating autocomplete suggestions.

The one or more candidate items are filtered based on availability (block 1612). The search system filters candidate items retrieved from the search log through an availability verification service of a digital service provider (DSP) system. For example, when candidate items include references to music tracks, the search system verifies whether each track remains available for streaming from the digital service provider system. Candidate items referencing digital content that is no longer accessible for streaming, download, or purchase through the digital service provider system are removed from consideration. The filtering ensures search results and suggestions include candidate items associated with currently accessible digital 1 content, such as streamable music tracks, downloadable videos, or purchasable albums maintained by the digital service provider system.

A ranking adjustment is generated for the one or more candidate items based on user interaction data describing user interaction with digital content associated with the one or more candidate items (block 1614). The search system calculates ranking adjustments for candidate items by applying a time-based decay factor to historical interaction data. For example, when processing candidate items retrieved from the search log, the search system applies a fifteen-day half-life parameter to weight recent interactions more heavily than older interactions. A candidate music track receiving one hundred clicks fifteen days ago receives a weighted score of fifty through multiplication of the initial weight by 0.5 raised to the power of the age in days divided by the half-life parameter. In contrast, a candidate track receiving eighty clicks on the current day maintains the full weighted score of eighty. The search system combines these decay-adjusted historical metrics with current day interaction totals to generate final ranking adjustment scores for each candidate item, enabling temporally relevant ordering of search results based on user engagement patterns.

A weighting is adjusted, respectively, to the filtered candidate items based on the ranking adjustment (block 1616). The search system modifies weights assigned to filtered candidate items according to calculated ranking adjustment scores. For example, a filtered candidate music track having a ranking adjustment score of fifty based on decay-adjusted click data receives a corresponding weight modification from an initial value of 1.0 to 0.5. The search system applies the weight modifications across the filtered candidate items to establish a relative ordering, with higher weighted items positioned more prominently in search results or suggestions. When multiple filtered candidate items exist, the search system adjusts respective weights in proportion to ranking adjustment scores derived from the historical interaction data, enabling refined ordering of search results based on demonstrated user engagement patterns while maintaining additional items from the initial search results. An output is then presented for display in a user interface (block 1618).

The interaction-based search adjustment system provides enhanced computational efficiency and improved search result accuracy through dynamic weighting adjustments based on historical user account interactions. By applying weighted adjustments to filtered candidate items according to ranking adjustments derived from user interaction data, the system reduces computational overhead that is otherwise spent processing and ranking less relevant content. The time-decay based weighting approach ensures search rankings remain fresh and relevant while still accounting for historical interaction patterns, enabling efficient prioritization of digital content that matches user account intent. This targeted approach reduces server load and database operations by focusing computational resources on content types demonstrated through user interaction data to have increased relevance. The system further optimizes resource utilization by maintaining a database of processed queries and associated interaction patterns, allowing rapid retrieval of pre-computed relevance scores rather than performing real-time calculations for each search request. Additionally, the weighting adjustment technique enables the system to dynamically adapt search result rankings based on actual user account behavior patterns while maintaining result diversity through preservation of non-candidate items.

Figure 17:
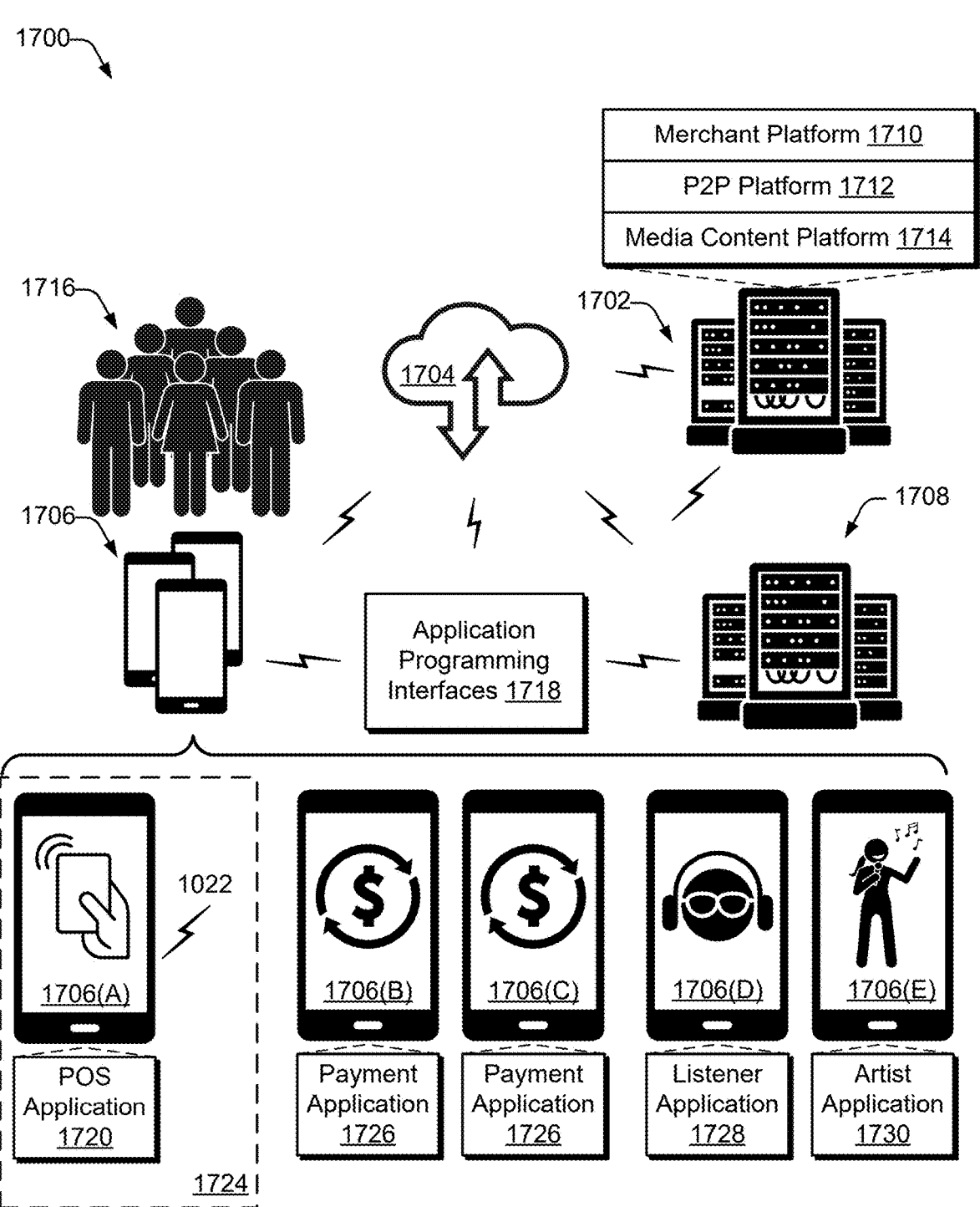
FIG. 17 is a non-limiting example illustrating an environment in which search techniques described herein are performed in accordance with one or more implementations.

FIG. 17 illustrates an example environment 1700 in which recommendation techniques described herein are performed in accordance with one or more implementations. The environment 1700 includes server(s) 1702 that can communicate over a network 1704 with end user devices 1706 and/or server(s) 1708 associated with third-party service provider(s). In various examples, the end user devices 1706 may comprise one or more seller devices 1706(A), one or more user devices 1706(B) and/or 1706(C) in a peer network, one or more content consumption devices 1706(D), one or more artist devices 1706(E), combinations of these examples, or other categories of user devices. The server(s) 1702 can be associated with one or more service providers that can provide one or more services for the benefit of users 1716, as described below. For example, the server(s) 1702 may enable services of service providers such as in association with a seller platform 1710 (which may further include a buyer platform), a peer-to-peer (P2P) payment platform 1712, a media content platform 1714, a combination of these platforms, or other platforms associated with other service providers. While services and features are referenced throughout in connection with a particular one of the seller platform 1710, the P2P payment platform 1712, or the media content platform 1714, it should be understood that any of these platforms may perform the functionality described in relation to any of the other platforms. Actions attributed to the service provider(s) can be performed by the server(s) 1702 and as shown for the system 102 and the client device 104 of FIG. 1.

In some examples, individual ones of the end user devices 1706 can be operable by users 1716. The users 1716 (individually referred to herein as "user 1716") can be referred to as customers, buyers, merchants, sellers, borrowers, employees, employers, payors, payees, couriers, artists, musicians, listeners, fans, supervisors, hosts, audience members, and so on. The users 1716 can interact with the end user devices 1706 via user interfaces presented via the end user devices 1706. In at least one example, a user interface can be presented via a web browser, or the like. Alternatively or additionally, a user interface can be presented via an application, such as a mobile application or desktop application, which can be provided by the seller platform 1710, the P2P payment platform 1712, and/or the media content platform 1714, or which can be an otherwise dedicated application. In some examples, individual end user devices 1706 can have an instance or versioned instance of an application, which can be downloaded from an application store, for example, which can present the user interface(s) described herein.

In at least one example, the users 1716 can include merchants that can operate the seller device(s) 1706(A) that are configured for use by merchants. For the purpose of this discussion, a "merchant" can be any entity that offers items (e.g., goods or services) for purchase or other means of acquisition (e.g., rent, borrow, barter, etc.). The merchants can offer items for purchase or other means of acquisition via brick-and-mortar stores, mobile stores (e.g., pop-up shops, food trucks, etc.), online stores, event venues, combinations of the foregoing, and so forth. In some examples, at least some of the merchants can be associated with the same entity but can have different merchant locations and/or can have franchise/franchisee relationships.

In additional or alternative examples, the merchants can be different merchants. For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN)s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

The seller device 1706(A) can have an instance of a point of sale ("POS") application 1720 stored thereon. The POS application 1720 can configure the seller device 1706(A) as a POS terminal, which enables the merchant to interact with one or more customers. In at least one example, interactions between the customers and the merchants that involve the exchange of funds (from the customers) for items or services (from the merchants) can be referred to as "transactions." In at least one example, the POS application 1720 can determine transaction data associated with the POS transactions.

Transaction data can include payment information, which can be obtained from a reader device 1722 associated with the seller device 1706(A), user authentication data, purchase amount information, point-of-purchase information (e.g., item(s) purchased, date of purchase, time of purchase, subscription type, etc.), etc. The POS application 1720 can send transaction data to the server(s) 1702 such that the server(s) 1702 can track transactions of the customers, merchants, and/or the users 1716 over time. Furthermore, the POS application 1720 can present a UI to enable the merchant to interact with the POS application 1720 and/or the seller platform 1710 via the POS application 1720.

In at least one example, the seller device 1706(A) can be a special-purpose computing device configured as a POS terminal (via the execution of the POS application 1720). In at least one example, the POS terminal may be connected to a reader device 1722, which is capable of accepting a variety of payment instruments, such as credit cards, debit cards, gift cards, short-range communication based payment instruments, and the like, as described below. In at least one example, the reader device 1722 can plug in to a port in the seller device 1706(A), such as a microphone port, a headphone port, an audio-jack, a data port, or other suitable port. In additional or alternative examples, the reader device 1722 can be coupled to the seller device 1706(A) via another wired or wireless connection, such as via Bluetooth®, BLE, and so on. In some examples, the reader device 1722 can be a software solution executing on the POS terminal, e.g., a mobile phone. In some examples, the reader device 1722 can read information from alternative payment instruments including, but not limited to, wristbands and the like.

In some examples, the reader device 1722 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards, hardware wallets, fobs, or devices configured for tapping). The POS terminal may provide a rich user interface, communicate with the reader device 1722, and communicate with the seller platform 1710, which can provide, among other services, a payment processing service. The server(s) 1702 associated with the seller platform 1710 can communicate with server(s) 1708, as described below. In this manner, the POS terminal and reader device 1722 may collectively process transaction(s) between the merchants and customers. In some examples, multiple POS terminal(s) may be connected to a number of other devices, such as "secondary" terminals, e.g., back-of-the-house systems, printers, line-buster devices, reader devices, speakers, and the like, to allow for information from the secondary terminal to be shared between the primary POS terminal(s) and secondary terminal(s), for example via short-range communication technology. This kind of arrangement may continue operation in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While the POS terminal and the reader device 1722 of the POS system 1724 are shown as separate devices, in additional or alternative examples, the POS terminal and the reader device 1722 can be part of a single device. In some examples, the reader device 1722 can have a display integrated therein for presenting information to customers of a merchant. In additional or alternative examples, the POS terminal can have a display integrated therein for presenting information to the customers of the merchant. POS systems, such as the POS system 1724, may be mobile, such that POS terminals and reader devices may process transactions in disparate locations across the world. POS systems can be used for processing card-present transactions and card-not-present (CNP) transactions.

A card-present transaction is a transaction where both a customer and the customer's payment instrument are physically present at the time of the transaction. Card-present transactions may be contact or contactless transactions processed by swipes (e.g., by sliding a magnetic strip through a reader device), dips (e.g., by inserting an embedded microchip into a reader device), taps (e.g., by wirelessly, through Bluetooth, NFC or other short range technology hover or tap a payment instrument into a reader device), or any other interaction between a physical payment instrument (e.g., a card), or otherwise present payment instrument, and a reader device 1722, whereby the reader device 1722 is able to obtain payment data from the payment instrument.

A CNP transaction is a transaction where a card, or other payment instrument, is not physically present at the POS such that payment data is manually keyed in (e.g., by a merchant, customer, etc.), or payment data is required to be recalled from a card-on-file data store, to complete the transaction.

The POS system 1724, the server(s) 1702, and/or the server(s) 1708 may exchange payment information and transaction data to determine whether transactions are authorized. For example, the POS system 1724 may provide encrypted payment data, user authentication data, purchase amount information, point-of-purchase information, etc. (collectively, transaction data) to server(s) 1702 over the network(s) 1704. The server(s) 1702 may send the transaction data to the server(s) 1708.

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. In at least one example, the service provider can serve as an acquirer and connect directly with the card payment network.

The card payment network (e.g., the server(s) 1708 associated therewith) can forward the fund transfer request to an issuing bank (e.g., "issuer"). The issuer is a bank or financial institution that offers a financial account (e.g., credit or debit card account) to a user. The issuer (e.g., the server(s) 1708 associated therewith) can make a determination as to whether the customer has the capacity to absorb the relevant charge associated with the payment transaction. In at least one example, the seller platform 1710 can serve as an issuer and/or can partner with an issuer. The transaction is either approved or rejected by the issuer and/or the card payment network (e.g., the server(s) 1708 associated therewith), and a payment authorization message is communicated from the issuer to the POS device via a path opposite of that described above, or via an alternate path.

The server(s) 1708 may send an authorization notification over the network(s) 1704 to the server(s) 1702, which may send the authorization notification to the POS system 1724 over the network(s) 1704 to indicate whether the transaction is authorized. The server(s) 1702 may also transmit additional information such as transaction identifiers to the POS system 1724. In one example, the server(s) 1702 may include a merchant application and/or other functional components for communicating with the POS system 1724 and/or the server(s) 1708 to authorize or decline transactions (e.g., the API 1718). In examples, the seller platform 1710 can enable the merchants to receive cash payments, payment card payments, and/or electronic payments from customers for POS transactions and the service provider can process transactions on behalf of the merchants.

Based on the authentication notification that is received by the POS system 1724 from server(s) 1702, the merchant may indicate to the customer whether the transaction has been approved. In some examples, approval may be indicated at the POS system 1724, for example, at a display of the POS system 1724. In some cases, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

The seller platform 1710 can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, onboarding services, identity verification (IDV) services, media content (e.g., music, videos, etc.) management and/or subscription services, and so on. In some examples, the user devices 1706 can access all of the services. In some cases, the user devices 1706 can have gradated access to the services, which can be based on risk tolerance, IDV outputs, subscriptions, and so on. In at least one example, access to such services can be availed to the merchants via the POS application 1720. In additional or alternative examples, each service can be associated with its own access point (e.g., application, web browser, etc.).

As the seller platform 1710 processes transactions on behalf of the merchants, the seller platform 1710 can maintain accounts or balances for the merchants in one or more ledgers. For example, the seller platform 1710 can analyze transaction data received for a transaction to determine an amount of funds owed to a merchant for the transaction and deposit funds into an account of the merchant. The account can have a stored balance, which can be managed by the seller platform 1710. The account can be different from a conventional bank account at least because the stored balance is managed by a ledger of the seller platform 1710 and the associated funds are accessible via various withdrawal channels including, but not limited to, scheduled deposit, same-day deposit, instant deposit, and a linked payment instrument.

A scheduled deposit can occur when the seller platform 1710 transfers funds associated with a stored balance of the merchant to a bank account of the merchant that is held at a bank or other financial institution (e.g., associated with the server(s) 1708). Scheduled deposits can occur at a prearranged time after a POS transaction is funded, which can be a business day after the POS transaction occurred, or sooner or later. In some examples, the merchant can access funds prior to a scheduled deposit (e.g., same-day deposits and/or real-time deposits). Further, in at least one example, the merchant can have a payment instrument that is linked to the stored balance that enables the merchant to access the funds without first transferring the funds from the account managed by the seller platform 1710 to the bank account of the merchant.

In at least one example, the seller platform 1710 may provide inventory management services. That is, the seller platform 1710 may provide inventory tracking and reporting. Inventory management services may enable the merchant to access and manage a database storing data associated with a quantity of each item that the merchant has available (i.e., an inventory). Furthermore, in at least one example, the seller platform 1710 can provide catalog management services to enable the merchant to maintain a catalog, which can be a database storing data associated with items that the merchant has available for acquisition (i.e., catalog management services). The seller platform 1710 can offer recommendations related to pricing of the items, placement of items on the catalog, and multi-party fulfillment of the inventory, to name a few examples.

In at least one example, the seller platform 1710 can provide business banking services, which allow the merchant to track deposits (from payment processing and/or other sources of funds) into an account of the merchant, payroll payments from the account (e.g., payments to employees of the merchant), payments to other merchants (e.g., business-to-business) directly from the account or from a linked debit card, withdrawals made via scheduled deposit and/or real-time deposit, configure allocations among multiple balances or accounts (e.g., spending, saving, taxes, etc.), etc. Furthermore, the business banking services can enable the merchant to obtain a customized payment instrument (e.g., credit card), check how much money the merchant is earning (e.g., via presentation of available earned balance), understand where the money of the merchant is going (e.g., via deposit reports (which can include a breakdown of fees), spend reports, etc.), access/use earned money (e.g., via scheduled deposit, real-time deposit, linked payment instrument, etc.), have improved control of the money of the merchant (e.g., via management of deposit schedule, deposit speed, linked instruments, etc.), etc. Moreover, the business banking services can enable the merchants to visualize their cash flow to track their financial health, set aside money for upcoming obligations (e.g., savings), organize money around goals, etc.

In at least one example, the seller platform 1710 can provide financing services and products, such as via business loans, consumer loans, fixed term loans, flexible term loans, and the like. In at least one example, the service provider can utilize one or more risk signals to determine whether to extend financing offers and/or terms associated with such financing offers. Such risk signals can be particular to an individual platform or service, as described herein, or can be based on aggregated data associated with multiple of the platforms or services. In at least one example, the seller platform 1710 can provide financing services for offering and/or lending a loan to a borrower that is to be used for, in some instances, financing the borrower's short-term operational needs (e.g., a capital loan). Additionally or alternatively, the seller platform 1710 can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant.

The seller platform 1710 can generate the loan based at least in part on determining that the borrower purchased or intends to purchase the item from the merchant. Advances, loans, or other funds provided to a merchant or other user can be repaid via a variety of mechanisms. In some examples, loans can be repaid in installments (e.g., multiple payments over time), at a particular date, from a portion of incoming funds (e.g., payments processed for the merchant, tax refunds, direct deposits, etc.), or the like.

The seller platform 1710 can provide web-development services, which enable users 1716 who are unfamiliar with HTML, XML, Javascript, CSS, or other web design tools to create and maintain functional websites. Further, in addition to websites, the web-development services can create and maintain other online omni-channel presences, such as social media posts for example. In some examples, the resulting web page(s) and/or other content items can be used for offering item(s) for sale via an online/e-commerce platform. In at least one example, the seller platform 1710 can recommend and/or generate content items to supplement omni-channel presences of the merchants.

Furthermore, the seller platform 1710 can provide payroll services to enable employers to pay employees for work performed on behalf of employers. In at least one example, the seller platform 1710 can receive data that includes time worked by an employee (e.g., through imported timecards and/or POS interactions), sales made by the employee, gratuities received by the employee, and so forth. Based on such data, the seller platform 1710 can make payroll payments to employee(s) on behalf of an employer via the payroll service. For instance, the seller platform 1710 can facilitate the transfer of a total amount to be paid out for the payroll of an employee from the bank of the employer to the bank of the seller platform 1710 to be used to make payroll payments. In at least one example, when the funds have been received at the bank of the seller platform 1710, the seller platform 1710 can pay the employee, such as by check or direct deposit.

Moreover, in at least one example, the seller platform 1710 can provide employee management services for managing schedules of employees. Further, the seller platform 1710 can provide appointment services for enabling users 1716 to set schedules for scheduling appointments and/or users 1716 to schedule appointments.

In some examples, the seller platform 1710 can provide restaurant management services to enable users 1716 to make and/or manage reservations, to monitor front-of-house and/or back-of-house operations, and so on. In such examples, the seller device(s) 1706(A) and/or server(s) 1702 can be configured to communicate with one or more other computing devices, which can be located in the front-of-house (e.g., POS device(s)) and/or back-of-house (e.g., kitchen display system(s) (KDS)). In at least one example, the seller platform 1710 can provide order management services and/or fulfillment services to enable restaurants (or other merchant types) to manage open tickets, split tickets, and so on and/or manage fulfillment services.

In some examples, the seller platform 1710 can provide omni-channel fulfillment services. A fulfillment service includes item ordering and delivery services, such as via a courier. In some examples, the courier can be an unmanned aerial vehicle (e.g., a drone), an autonomous vehicle, or any other type of vehicle capable of receiving instructions for traveling between locations. For instance, if a customer places an order with a merchant and the merchant cannot fulfill the order because one or more items are out of stock or otherwise unavailable, the seller platform 1710 can leverage other merchants and/or sales channels that are part of the seller platform 1710 to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the seller platform 1710 can enable conversational commerce via conversational commerce services, which can use one or more machine learning mechanisms to analyze messages exchanged between two or more users 1716, voice inputs into a virtual assistant or the like, to determine intents of user(s) 1716. In some examples, the seller platform 1710 can utilize determined intents to automate customer service, offer promotions, provide recommendations, or otherwise interact with customers in real-time. In at least one example, the seller platform 1710 can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, a user 1716 may be new to the seller platform 1710 such that the user 1716 that has not registered (e.g., subscribed to receive access to one or more services offered by the seller platform 1710) with the seller platform 1710. The seller platform 1710 can offer onboarding services for registering a potential user 1716 with the seller platform 1710. In some examples, onboarding can involve presenting various questions, prompts, and the like to a potential user 1716 to obtain information that can be used to generate a profile for the potential user 1716. In at least one example, the seller platform 1710 can provide limited or short-term access to its services prior to, or during, onboarding (e.g., a user of a peer-to-peer payment service can transfer and/or receive funds prior to being fully onboarded, a merchant can process payments prior to being fully onboarded, a user of a music streaming service can listen to music having advertisement breaks prior to being fully onboarded, etc.). In response to full or partial completion of onboarding, any limited or short-term access to services of the seller platform 1710 can be transitioned to more permissive (e.g., less limited) or longer-term access to such services.

The seller platform 1710 can be associated with IDV services, which can be used by the seller platform 1710 for compliance purposes and/or can be offered as a service, for instance to third-party service providers (e.g., associated with the server(s) 1708). That is, the seller platform 1710 can offer IDV services to verify the identity of users 1716 seeking to use or using their services. Identity verification may involve requesting a customer (or potential customer) to provide information that is used by compliance departments to prove that the information is associated with an identity of a real person or entity (e.g., an artist). In at least one example, the seller platform 1710 can perform services for determining whether identifying information provided by a user 1716 accurately identifies the customer (or potential customer).

Techniques described herein can be configured to operate in both real-time/online and offline modes. "Online" modes refer to modes when devices are capable of communicating with the seller platform 1710 while offline mode refers to modes when devices are unable to communicate with the server(s) 1708 due to network connectivity issue, for example. In such examples, devices may operate in "offline" mode where at least some payment data is stored (e.g., on the seller device(s) 1706(A)) and/or the server(s) 1702 until connectivity is restored and the payment data can be transmitted to the server(s) 1702 and/or the server(s) 1708 for processing.

In at least one example, the seller platform 1710 can be associated with a hub, such as an order hub, an inventory hub, a fulfillment hub and so on, which can enable integration with one or more additional service providers (e.g., associated with the additional server(s) 1708). In some examples, such additional service providers can offer additional or alternative services and the service provider can provide an interface or other computer-readable instructions to integrate functionality of the service provider into the one or more additional service providers.

Turning now to the P2P functionality provided by the environment 1700, the P2P platform 1712 can provide a peer-to-peer payment service that enables peer-to-peer payments between two or more of the users 1716. Two or more of the users 1716 may be considered "peers" in a peer-to-peer interaction, such as a payment. In at least one example, the P2P platform 1712 can communicate with instances of a payment application 1726 (or other access point) installed on end user devices 1706 configured for operation by the users 1716. In an example, an instance of the payment application 1726 executing on a first user device 1706(B) operated by a payor (e.g., one of the users 1716) can send a request to the P2P platform 1712 to transfer an asset (e.g., fiat currency, non-fiat currency, digital assets such as non-fungible tokens (NFTs), cryptocurrency, securities, gift cards, and/or related assets) from the payor to a payee (e.g., a different one of the users 1716) via a peer-to-peer payment. In some examples, assets associated with an account of the payor are transferred to an account of the payee. In some examples, assets can be held at least temporarily in an account of the P2P platform 1712 prior to transferring the assets to the account of the payee.

In some examples, the P2P platform 1712 can utilize a ledger system to track transfers of assets between users 1716. FIG. 18, below, provides additional details associated with such a ledger system. The ledger system can enable users 1716 to own fractional shares of assets that are not conventionally available. For instance, a user can own a fraction of a Bitcoin, an NFT, or a stock. Additional details are described herein.

In at least one example, the P2P platform 1712 can facilitate transfers and can send notifications related thereto to instances of the payment application 1726 executing on user device(s) of payee(s). As an example, the P2P platform 1712 can transfer assets from an account of a first user to an account of a second user and can send a notification to the user device 1706(B) of the second user for presentation via a user interface. The notification can indicate that a transfer is in process, a transfer is complete, or the like. In some examples, the P2P platform 1712 can send additional or alternative information to the instances of the payment application 1726 (e.g., low balance to the payor, current balance to the payor or the payee, etc.). In some examples, the payor and/or payee can be identified automatically, e.g., based on context, proximity, prior transaction history, and so on. In other examples, the payee can send a request for funds to the payor prior to the payor initiating the transfer of funds. In some embodiments, the P2P platform 1712 funds the request to payee on behalf of the payor, to speed up the transfer process and compensate for lags that may be attributed to the payor's financial network.

In some examples, the P2P platform 1712 can trigger the peer-to-peer payment process through identification of a "payment proxy" having a particular syntax. The payment proxy is useable in lieu of payment data. That is, payment data and a payment proxy can be linked to, or otherwise associated with, a user account of a user and either can be used for making payments. In an example, the syntax can include a monetary currency indicator prefixing one or more alphanumeric characters (e.g., $Cash). The currency indicator operates as the tagging mechanism that indicates to the server(s) 1702 to treat the inputs as a request from the payor to transfer assets, where detection of the syntax triggers a transfer of assets. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol or other symbol could equally be used. In some examples, additional or alternative identifiers can be used to trigger the peer-to-peer payment process. For instance, email, telephone number, social media handles, artist or band names, and/or the like can be used to trigger and/or identify users of a peer-to-peer payment process.

In some examples, the peer-to-peer payment process can be initiated through instances of the payment application 1726 executing on the end user devices 1706. In at least some embodiments, the peer-to-peer process can be implemented within a landing page associated with a user and/or an identifier of a user. The term "landing page," as used here, refers to a virtual location identified by a personalized location address that is dedicated to collect payments on behalf of a recipient associated with the personalized location address. The personalized location address that identifies the landing page can be a uniform resource locator (URL), which can include a payment proxy discussed above. The P2P platform 1712 can generate the landing page to enable the recipient to conveniently receive one or more payments from one or more senders.

In some examples, the peer-to-peer payment process can be implemented within a forum. The term "forum," as used here, refers to a content provider's media channel (e.g., a social networking platform, a microblog, a blog, video sharing platform, a music sharing platform, etc.) that enables user interaction and engagement through streaming of content, comments, posts, messages on electronic bulletin boards, messages on a social networking platform, and/or any other types of messages. In some examples, the content provider can be the service provider as described with reference to FIG. 17 or a third-party service provider associated with the server(s) 1708. In examples where the content provider is a third-party service provider, the server(s) 1708 can be accessible via one or more APIs 1718 or other integrations. In some examples, "forum" may also refer to an application or webpage of an e-commerce or retail organization that offers products and/or services. Such websites can provide an online "form" to complete before or after the products or services are added to a virtual cart. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application, such as a messaging application. The term "messaging application," as used here, refers to any messaging application that enables communication between users (e.g., sender and recipient of a message) over a wired or wireless communications network, through use of a communication message. The messaging application can be internal to the P2P platform 1712 (e.g., the P2P platform 1712 offers a chat or messaging service that is within the payment application or accessible via the payment application). In some examples, the messaging application can be external to the P2P platform 1712. (e.g., the messaging application is hosted by a third-party service provider associated with the server(s) 1708, which can be accessible via one or more of the APIs 1718 or other integrations). The messaging application can include, for example, a text messaging application for communication between phones (e.g., conventional mobile telephones or smartphones), or a cross-platform instant messaging application for smartphones and phones that use the Internet for communication.

Funds received from payments can be stored in stored balances that are linked to, or otherwise associated with, user accounts. In some examples, the P2P platform 1712 can enable users 1716 to perform banking transactions via instances of the payment application 1726. For example, users can configure direct deposits, recurring deposits, or other deposits (e.g., tax refunds, loans, etc.) for adding assets to their various ledgers/balances. In some examples, users can deposit physical cash via ATMs or other deposit sources, which can include merchants, such as those merchants that utilize the payment processing system described above. In some examples, the P2P platform 1712 can enable users to allocate funds between different accounts, sub-accounts, or balances (e.g., spending, saving, different assets, different currencies), etc. Further, users 1716 can configure bill pay, recurring payments, and/or the like using assets associated with their accounts. In some examples, the P2P platform 1712, with consent of the user, can track individual transactions made using the payment application and can utilize such transaction data to make personalized or customized recommendations, determine creditworthiness, generate tax documentation, and/or the like.

In addition to sending and/or receiving assets via peer-to-peer transactions, the P2P platform 1712 enables users to buy and/or sell assets via asset networks such as cryptocurrency networks, securities networks, and/or the like. In some examples, acquisition of such assets can be in whole or fractional shares. The ledger system described below with reference to FIG. 18 can enable such assets to be acquired in fractional shares and/or in real-time or near real-time (by delaying or omitting the need to buy/sell assets via asset networks or exchanges). In some examples, users can "gift" assets to other users, for example, by transferring cryptocurrency, stocks, or the like to one another.

In some examples, the P2P platform 1712 can enable users to link payment instruments to their user accounts. As a result, users can use their linked payment instruments to access funds in their accounts or balances. In some examples, the payment instrument can be a credit card, debit card, card linked to multiple accounts or balances via software or hardware, a fob or other object having payment data stored thereon, or the like. In some examples, the payment instrument can be a virtual payment instrument or a physical payment instrument. In some examples, the virtual payment instrument can be issued in real-time or for temporary usage. In some examples, the virtual payment instrument can have the same or different payment data as a corresponding physical payment instrument. Payment instruments can be customizable using a design user interface of the payment application. Such customization can enable users to select colors, stamps, images, text, or the like for surface(s) of their payment instruments. In some examples, users can draw or otherwise interact with the design user interface to personalize surface(s) of their payment instruments.

In some examples, users can associate incentives with their payment instruments. Incentives can be recommended to users based on user preferences (inferred or explicitly identified), geolocation, propensity to redeem, value, and/or the like. In some examples, incentives can be particular to individual merchants, types of merchants, types of transactions, and/or the like. In at least one example, when a user uses their payment instrument at a merchant or type of merchant associated with an incentive, or for a transaction type associated with an incentive, the P2P platform 1712 can automatically apply the incentive to the transaction. In some examples, users can gift other users "gift cards" that can be associated with payment instruments. That is, a user can transfer an amount of funds to another user and such funds can be associated with a condition (e.g., merchant, merchant type, transaction type, location, etc.) that, upon satisfaction, enables the amount of funds, or a portion thereof, to be applied to a transaction. In at least one example, when a user uses their payment instrument for a transaction that satisfies the condition, the P2P platform 1712 can automatically apply the amount of funds associated with the gift card to the transaction.

In some examples, users can configure their account such that when they use their payment instruments, the P2P platform 1712 can deposit an amount of funds into a savings account, investing account, bitcoin account, or the like.

In some examples, users can search for or browse other users, merchants, items, or the like via the payment application. In some examples, search results can be personalized and/or customized for the user (e.g., based on user data collected with consent of the user). In some examples, users can shop or otherwise purchase items from other users, merchants, or the like from within the payment application or via a deep link to a merchant application or website.

The P2P platform 1712 can offer primary and secondary accounts, wherein a primary account is a sponsor or other delegate of one or more secondary accounts. Such accounts can be useful for families, wherein a parent or other guardian is a sponsor or delegate to one or more child accounts, or where a child is a sponsor or delegate of an elderly parent's account. In some examples, primary accounts can establish limits on secondary accounts, such as spending limits, or the like. In some examples, the primary account owner is the user legally responsible for the account and their identity may be verifiable for secondary user accounts to perform certain transactions, such as buying/selling cryptocurrency or stocks. In some examples, one or more primary accounts and one or more secondary accounts can form a "group" with shared goals, such as saving, investing, or the like.

The P2P platform 1712 can present activity data via an activity user interface of the payment application. In some examples, activity can be presented by merchant, date, time, amount, or the like. In some examples, interactions between entities can be represented in conversational communications such that each interaction or transaction is represented as a message. In some examples, users can interact with individual messages and/or send/request funds from within such a conversational communication. In some examples, such conversational communications can represent conversations of a group of two or more users. Groups can be used to pool funds, obtain group discounts or incentives, or enable multiple users to participate in financial transactions together (e.g., group investing, group savings, etc.).

The P2P platform 1712 can offer a variety of financial training or learning opportunities. In some examples, such training or learning can be personalized for individual users, for example, based on user data and/or transaction data of the user that is obtained with consent of the user. In some examples, such user data and/or transaction data can be analyzed to make actionable recommendations with respect to optimizing financial health of users of the P2P platform 1712.

In some examples, components of the environment 1700 may be integrated to enable payments at the point-of-sale using assets associated with user accounts of the P2P platform 1712. As illustrated in the environment 1700, the components can communicate with one another via the network 1704, where one or more APIs 1718 or other functional components can be used to facilitate such communication.

In at least one example, an integration can enable a customer to participate in a transaction via their own computing device (e.g., user device 1706(B)) instead of interacting with a merchant device of a merchant, such as the seller device 1706(A). In such an example, the POS application 1720, associated with a payment processing platform and executable by the seller device 1706(A) of the merchant, can present a Quick Response (QR) code, or other code that can be used to identify a transaction (e.g., a transaction code), in association with a transaction between the customer and the merchant. The QR code, or other transaction code, can be provided to the POS application 1720 via an API 1718 associated with the peer-to-peer payment platform. In an example, the customer can utilize their own computing device, such as the user device 1706(B), to capture the QR code, or the other transaction code, and to provide an indication of the captured QR code, or other transaction code, to server(s) 1702.

Based at least in part on the integration of the peer-to-peer payment platform and the payment processing platform (e.g., via the API 1718), the server(s) 1702 of the seller platform 1710 can exchange communications with a payment application 1726 associated with the P2P platform 1712 and/or the POS application 1720 to process payment for the transaction using a peer-to-peer payment where the customer is a first "peer" and the merchant is a second "peer."

Based at least in part on receiving an indication of which payment method a user (e.g., customer or merchant) intends to use for a transaction, techniques described herein utilize an integration between the P2P platform 1712 and seller platform 1710 (which can be a first- or third-party integration) such that a QR code, or other transaction code, specific to the transaction can be used for providing transaction details, location details, customer details, or the like to a computing device of the customer, such as the user device 1706(B), to enable a contactless (peer-to-peer) payment for the transaction, and transferring funds from an account of the customer to an account of the merchant.

In at least one example, techniques described herein can offer improvements to conventional payment technologies at both brick-and-mortar points of sale and online points of sale. For example, at brick-and-mortar points of sale, techniques described herein can enable customers to "scan to pay," by using their computing devices to scan QR codes, or other transaction codes, encoded with data as described herein, to remit payments for transactions. In such a "scan to pay" example, a customer computing device, such as the user device 1706(B), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc. In another example, merchants can "scan for payment" such that a customer can present a QR code, or other transaction code, that can be linked to a payment instrument or stored balance. Funds associated with the payment instrument or stored balance can be used for payment of a transaction.

As described above, techniques described herein can offer improvements to conventional payment technologies at online points of sale, as well as brick-and-mortar points of sale. For example, multiple applications can be used in combination during checkout. That is, the POS application 1720 and the payment application 1726, as described herein, can process a payment transaction by routing information input via the merchant application to the payment application for completing a "frictionless" payment.

Returning to the "scan to pay" examples described herein, QR codes, or other transaction codes, can be presented in association with a merchant web page or ecommerce web page. In at least one example, techniques described herein can enable customers to "scan to pay," by using their computing devices to scan or otherwise capture QR codes, or other transaction codes, encoded with data, as described herein, to remit payments for online/ecommerce transactions. A customer computing device, such as the user device 1706(B), can be specially configured as a buyer-facing device having functionality similar to the functionality described above in the brick-and-mortar example.

In some examples, based at least in part on capturing the QR code, or other transaction code, the seller platform 1710 can provide transaction data to the P2P platform 1712 for presentation via the payment application 1726 on the computing device of the customer, such as the user device 1706B (B), to enable the customer to complete the transaction via their own computing device. In some examples, in response to receiving an indication that the QR code, or other transaction code, has been captured or otherwise interacted with via the customer computing device, the P2P platform 1712 can determine that the customer authorizes payment of the transaction using funds associated with a stored balance of the customer that is managed and/or maintained by the P2P platform 1712. Such authorization can be implicit such that the interaction with the transaction code can imply authorization of the customer. Alternatively or additionally, the P2P platform 1712 can request express authorization to process payment for the transaction using the funds associated with the stored balance and the customer can interact with the payment application to expressly authorize the settlement of the transaction. In some examples, such an authorization (implicit or express) can be provided prior to a transaction being complete and/or initialization of a conventional payment flow. That is, in some examples, such an authorization can be provided during cart building (e.g., adding item(s) to a virtual cart) and/or prior to payment selection. In some examples, such an authorization can be provided after payment is complete (e.g., via another payment instrument). Based at least in part on receiving an authorization to use funds associated with the stored balance (e.g., implicitly or explicitly) of the customer, the P2P platform 1712 can transfer funds from the stored balance of the customer to the seller platform 1710. In at least one example, the seller platform 1710 can deposit the funds, or a portion thereof, into a stored balance of the merchant that is managed and/or maintained by the seller platform 1710. In such an example, the seller platform 1710 can be a "peer" to the customer in a peer-to-peer transaction.

In some examples, techniques described herein can enable the customer to interact with the transaction after payment for the transaction has been settled. For example, in at least one example, the seller platform 1710 can cause a total amount of a transaction to be presented via a user interface associated with the payment application 1726 such that the customer can provide gratuity, feedback, loyalty information, or the like, via an interaction with the user interface. In another example, the seller platform 1710 can adjust a total amount of a transaction based on events during a shopping experience, such as adding or removing a charge to the total amount based on whether a media content item requested by the customer to be played during a shopping experience was in fact played. In some examples, because the customer has already authorized payment via the P2P platform 1712, if the customer inputs a tip and/or an event affecting the total amount of the transaction is triggered, the P2P platform 1712 can transfer additional funds, associated with the tip or event, to the seller platform 1710. This pre-authorization (or maintained authorization) of sorts can enable faster, more efficient payment processing when the tip is received and/or the event initiates the trigger. Further, the customer can provide feedback and/or loyalty information via the user interface presented by the payment application, which can be associated with the transaction. Using the pre-authorization techniques described herein results in fewer data transmissions and thus, techniques described herein can conserve bandwidth and reduce network congestion. Moreover, as described above, funds associated with tips can be received faster and more efficiently than with conventional payment technologies.

In addition to the improvements described above, techniques described herein can provide enhanced security in payment processing. In some examples, if a camera, or other sensor, used to capture a QR code, or other transaction code, is integrated into a payment application 1726 (e.g., instead of a native camera, or other sensor), techniques described herein can utilize an indication of the QR code, or other transaction code, received from the payment application for two-factor authentication to enable more secure payments.

It should be noted that, while techniques described herein are directed to contactless payments using QR codes or other transaction codes, in additional or alternative examples, techniques described herein can be applicable for contact payments. That is, in some examples, a customer can swipe a payment instrument (e.g., a credit card, a debit card, or the like) via a reader device associated with a merchant device, dip a payment instrument into a reader device associated with a merchant computing device, tap a payment instrument with a reader device associated with a merchant computing device, or the like, to initiate the provisioning of transaction data to the customer computing device. In some examples, the payment instrument can be associated with the P2P platform 1712 as described herein (e.g., a debit card linked to a stored balance of a customer) such that when the payment instrument is caused to interact with a payment reader, the seller platform 1710 can exchange communications with the P2P platform 1712 to authorize payment for a transaction and/or provision associated transaction data to a computing device of the customer associated with the transaction.

Turning now to media content functionality provided by the environment 1700, the media content platform 1714 can provide digital media to a content consumption device 1706(D) where playback may occur using "streaming." In examples, "streaming" media content involves encoding the media content and transmitting the encoded media content over the network 1704 to a media player or a media application executing on a device (e.g., via a speaker). The device then decodes and plays the media content while data is being received. In some cases, a buffer queues some of the data of the media content (e.g., audio data, video data, etc.) ahead of the media being played. During moments of network congestion, which leads to lower available bandwidth, less media content data is added to the buffer, which drains down as media content is being dequeued during streaming playback. However, during moments of high network bandwidth, the buffer is replenished, adding media content data to the buffer.

In at least one example, the media content platform 1714 can provide a digital media streaming service (e.g., subscription-based, non-subscription-based) that enables a content consumption device 1706(D) to stream and/or download digital media content via a listener application 1728 installed on the content consumption device 1706(D). For instance, the media content platform 1714 may comprise a digital audio streaming service (e.g., for music, podcasts, audiobooks, etc.), a digital video streaming service, and/or a streaming service that provides streaming of various different types of digital media content or multimedia. In such cases where digital media content items are downloaded and stored locally on the content consumption devices 1706(D), the listener application 1728 may verify access rights to the digital media content items at time intervals, for instance intermittently (e.g., when the content consumption device 1706(D) has a network connection with the media content platform 1714 via the network(s) 1704), and/or at regular intervals (e.g., daily, weekly, monthly, etc.). In examples, access rights to the digital media content items may be provided when a subscription to the media content platform 1714 is active, while access rights to the digital media content items may be withheld when the subscription to the media content platform 1714 is terminated. Enabling storage on the end user devices 1706 and subsequent access to digital media content items via the listener application 1728 provides the users 1716 with the ability to access the digital media content items "offline" such as when a connection to the media content platform 1714 via the network(s) 1704 is unavailable or unreliable.

In some examples, the media content platform 1714 may additionally or alternatively provide an artist management service that enables the users 1716 to manage aspects of artist business via an artist application 1730 installed on the artist device 1706(E), such as data analytics and management (e.g., listener data, consumer data, etc.), marketing, regulatory obligations, cash flow management, publishing, customer relationship management (CRM), social media, event coordination, industry communications, digital media content ingestion and storage, and so forth. In some cases, the users 1716 can have graduated access to the services, which can be based on a user type (e.g., artist, group member, personal manager, business manager, attorney, agent, etc.), risk tolerance, artist verification status, listener and/or viewer analytics (e.g., number of streams in a month), and so on. In some cases, multiple users 1716 may have access to a single user account via respective end user devices 1706, with the various users having different access privileges to services provided by the artist management service. In various scenarios, an artist can designate functions provided by the artist management service to different members of the team associated with the artist, thus granting the respective team members access to services suited to the skills of the individual team members.

In some cases, the artist application 1730 and the listener application 1728 may be distinct applications having differing user experiences and verification processes for access, such as illustrated in the environment 1700. For instance, the media content platform 1714 may request additional verification, such as a link to an artist website, a sample of an artist's work, a verified credential supplied by a third party, etc. to grant access to the artist application 1730 in addition to information requested to access the listener application 1728. Further, the artist application 1730 may provide the artist management services described herein, without the subscription-based digital media streaming services described herein, and vice versa. However, examples are also considered in which functionality provided by the artist application 1730 and the listener application 1728 partially or fully overlap, and/or where verification processes for access are substantially similar.

In at least some examples, the media content platform 1714 enables interaction between the users 1716 utilizing the listener application 1728 installed on the content consumption devices 1706(D), and the users 1716 utilizing the artist application 1730 installed on the artist devices 1706 (E). For example, the media content platform 1714 may provide interconnectivity between the subscription-based digital media streaming service and the artist management service. Functionality provided by the media content platform 1714 in such instances may include a communication channel between one or more of the users 1716 (e.g., a listener, fan, music supervisor, publisher, etc.) utilizing the listener application 1728 and another user (e.g., an artist) of the users 1716 utilizing the artist application 1730. The communication channel may include, for instance, a messaging platform (also referred to as a "messaging application" herein), a live streaming platform, a videoconferencing or teleconferencing platform, and/or a combination of these.

Additionally, in some cases, the media content platform 1714 may facilitate a resource transfer between the listener application 1728 and the artist application 1730. In an example, the media content platform 1714 may direct a resource, such as a portion of a subscription fee paid by one of the users 1716 designated as a listener, to one or more of the users 1716 designated as artists based on a number of instances that the listening user consumed (e.g., streamed, downloaded, etc.) content created by respective ones of the artist users. Alternatively or additionally, the media content platform 1714 may direct a resource, such as funds, from an account associated with a listening user to an account associated with an artist user (or vice versa), in accordance with transfers between accounts as described herein. The media content platform 1714 may facilitate resource transfers in examples such as merchandise purchases, event ticket purchases, "tipping" an artist, payments for royalties or other fees, and so forth.

In some examples, the media content platform 1714 enables interaction between individual ones of the users 1716 with one another via the listener application 1728 installed on the content consumption device 1706(D) and other of the content consumption devices 1706(D) via a communication channel as described above. In an example, the listener application 1728 may provide functionality via a communication channel for a user to stream an individual digital media item, a playlist, or the like to an audience comprising other ones of the content consumption devices 1706(D). Alternatively or additionally, the communication channel may facilitate sharing of individual digital media items, playlists, user and/or artist profiles, and the like between the users 1716 via messages, uniform resource locators (URLs), quick response (QR) codes, and so forth.

In some cases, the media content platform 1714 enables interaction between individual ones of the users 1716 with one another via the artist application 1730 installed on the artist device 1706(E) and other of the artist devices 1706 via a communication channel as described above. In some instances, the media content platform 1714 may provide recommendations for a particular user indicating which of the other users 1716 to communicate with. Such a recommendation may be based on a similarity (or dissimilarity) of content created by two or more of the users 1716, an overlap (or lack thereof) of audience members of the users 1716, a geographic location of the users 1716, a coinciding event location of the users 1716, and so forth. In some examples, a user may input parameters for a desired connection via the artist application 1730, and the media content platform 1714 may filter which of the users 1716 to surface for recommendations to the user based on the input parameters. Alternatively or additionally, the media content platform 1714 may implement one or more machine learning models to filter which of the users 1716 to surface for recommendations to the user. The recommendations provided by the media content platform 1714 may be data driven and thus increase relevance of communications presented to the users 1716 and reduce unsolicited communications that may be received by the users 1716.

The media content platform 1714 may interact with the server(s) 1708 associated with the third-party service providers to, for instance, ingest digital media items, report digital media consumption data, pay royalties, and the like. In some examples, the server(s) 1708 may be accessible by the media content platform 1714 via one or more APIs 1718 or other integrations. In some cases, the third-party service provider may be a digital media content provider (e.g., a record label, a performance rights organization (PRO), an independent artist, etc.). In such cases, the media content platform 1714 may receive digital media content items from the server(s) 1708, along with metadata associated with the digital media content items. The metadata, in some instances, may indicate individual contributors to a digital media content item such as an artist or artists, a songwriter (e.g., a composer, lyricist, author, etc.), a producer (which may further include a co-producer, a mastering engineer, a mixing engineer, a recording engineer, an arranger, a programmer, etc.), a musician (e.g., instrumentalist, vocalist, etc.), a visual artist, and so forth, with an indication of the role of the individual contributor. Alternatively or additionally, the metadata may indicate information such as release date, track title, track duration, clean or explicit version, jurisdiction information, and the like. The media content platform 1714 may use the metadata to associate the digital media content item as being created by a particular user, to provide search results to the users 1716, to generate playlists, and so forth. Further, the media content platform 1714 may provide payments (e.g., royalties) to the third-party service provider based on a number of streams and/or downloads of individual digital media content items by the users via the listener application 1728.

Techniques described herein are directed to services provided via a distributed system of end user devices 1706 that are in communication with server(s) 1702 of the service provider. That is, techniques described herein are directed to a specific implementation—or, a practical application—of utilizing a distributed system of end user devices 1706 that are in communication with server(s) 1702 of the seller platform 1710, the P2P platform 1712, and/or the media content platform 1714 to perform a variety of services, as described above. The unconventional configuration of the distributed system described herein enables the server(s) 1702 that are remotely-located from end-users (e.g., users 1716) to intelligently offer services based on aggregated data associated with the end-users, such as the users 1716 (e.g., data associated with multiple, different merchants and/or multiple, different buyers; data associated with multiple different listeners and/or multiple different artists, etc.), in some examples, in near-real time. Accordingly, techniques described herein are directed to a particular arrangement of elements that offer technical improvements over conventional techniques for performing payment processing services, P2P payment services, media content services, and the like. For small business owners and artists in particular, the business environment is typically fragmented and relies on unrelated tools and programs, making it difficult for an owner or an artist to manually consolidate and view such data. The techniques described herein constantly or periodically monitor disparate and distinct user accounts, e.g., accounts within the control of the seller platform 1710, the P2P platform 1712, and/or the media content platform 1714, and those outside of the control of these service providers, to track the standing (payables, receivables, payroll, invoices, appointments, capital, balances, collaborations, etc.) of the users 1716. The techniques herein provide a consolidated view of a user's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services, P2P payment services, media content services, and/or additional or alternative services described herein. In some implementations, the distributed system is capable of applying the intelligence derived from an existing user base to a new user, thereby making the onboarding experience for the new user personalized and frictionless when compared to traditional onboarding methods. Further, models or algorithms that are used to implement techniques described herein may be retrained over time to improve outcomes for subsequent scenarios based on outcomes of previous scenarios. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 1716 and end user devices 1706. Furthermore, such features are changed dynamically based on the profiles of the users involved interacting with the GUIs. As such, techniques described herein are directed to improvements to computing systems.

The seller platform 1710, the P2P platform 1712, and/or the media content platform 1714 are capable of providing additional or alternative services, and the services described above are offered as a sampling of services. In at least one example, the seller platform 1710, the P2P platform 1712, and/or the media content platform 1714 can exchange data with the server(s) 1708 associated with third-party service providers. Such third-party service providers can provide information that enables the seller platform 1710, the P2P platform 1712, and/or the media content platform 1714 to provide services, such as those described above. In additional or alternative examples, such third-party service providers can access services of the seller platform 1710, the P2P platform 1712, and/or the media content platform 1714. That is, in some examples, the third-party service providers can be subscribers, or otherwise access, services of the seller platform 1710, the P2P platform 1712, and/or the media content platform 1714.

FIG. 18 illustrates an example environment 1800 including a service provider system 1802 which may be associated with the server(s) 1702 of FIG. 17. The environment 1800 may also include a user device 1804, which may correspond to any of the end user devices 1706 described in relation to FIG. 17. In examples, the service provider system 1802 may include one or a combination of the seller platform 1710, the P2P platform 1712, or the media content platform 1714, as well as one or more data store(s) 1806 that can store assets in an asset storage 1808, as well as data in user account(s) 1810. In some examples, the environment 1800 may also include a public blockchain 1814, one or more nodes 1816, and/or a hardware wallet 1818. The service provider system 1802, the user device 1804, public blockchain 1814, the node(s) 1816, and the hardware wallet 1818 may be connected and able to communicate via one or more networks 1820, which may have the same or similar functionality described in relation to the network 1704 of FIG. 17.

In some examples, user account(s) 1810 can include merchant account(s), customer account(s), media content subscriber account(s), artist account(s), and so forth. In at least one example, the asset storage 1808 can be used to record whether individual assets are registered to a user account 1810. For example, the asset storage 1808 can include asset wallet(s) 1822 for storing records of assets owned by the service provider system 1802, such as cryptocurrency, securities, NFTs, or the like, and communicating with one or more asset networks, such as cryptocurrency networks, NFT networks, securities networks, or the like. In some examples, the asset network can be a first-party network or a third-party network, such as a cryptocurrency exchange or the stock market. In examples where the asset network is a third-party network, the server(s) 1708 of FIG. 17 can be associated therewith.

The asset wallet 1822 can be associated with one or more addresses and can vary addresses used to acquire assets (e.g., from the asset network(s)) so that its holdings are represented under a variety of addresses on the asset network. In examples where the service provider system 1802 has holdings of cryptocurrency (e.g., in the asset wallet 1822), a user can acquire cryptocurrency directly from the service provider system 1802. In some examples, the service provider system 1802 can include logic for buying and selling cryptocurrency to maintain a desired level of cryptocurrency. In some examples, the desired level can be based on a volume of transactions over a period of time, balances of collective cryptocurrency ledgers, exchange rates, or trends in changing of exchange rates such that the cryptocurrency is trending towards gaining or losing value with respect to the fiat currency. In some scenarios, the buying and selling of cryptocurrency, and therefore the associated updating of the public ledger of an asset network can be separate from a customer-merchant transaction or a peer-to-peer transaction, and therefore not necessarily time-sensitive. This can enable batching transactions to reduce computational resources and/or costs. The service provider system 1802 can provide the same or similar functionality for securities or other assets.

The asset storage 1808 may contain ledgers that store records of assignments of assets to users 1716. Specifically, the asset storage 1808 may include asset ledger 1824, fiat currency ledger 1826, and/or other ledger(s) 1828, which can be used to record transfers of assets between users 1716 and/or one or more third-parties (e.g., merchant network(s), payment card network(s), ACH network(s), equities network(s), the asset network, securities networks, etc.). In doing so, the asset storage 1808 can maintain a running balance of assets managed by the service provider system 1802. The ledger(s) of the asset storage 1808 can further indicate some of the running balance for individual ledger(s) stored in the asset storage 1808 are assigned or registered to one or more user account(s) 1810.

In at least one example, the asset storage 1808 can include transaction logs 1830, which can include, as transaction data, records of past transactions involving the service provider system 1802 and/or the user account 1810. In some examples, the data store(s) 1806 can store a private blockchain 1832. A private blockchain 1832 can function to record sender addresses, recipient addresses, public keys, values of cryptocurrency transferred, and/or can be used to verify ownership of cryptocurrency tokens to be transferred. In some examples, the service provider system 1802 can record transactions involving cryptocurrency until the number of transactions has exceeded a determined limit (e.g., number of transactions, storage space allocation, etc.). Based at least in part on determining that the limit has been reached, the service provider system 1802 can publish the transactions in the private blockchain 1832 to the public blockchain 1814 (e.g., associated with the asset network), where miners can verify the transactions and record the transactions to blocks on the public blockchain 1814. In at least one example, the service provider system 1802 can participate as miner(s) at least for transactions to which the respective platform is a party to, to be posted to the public blockchain 1814.

In some cases, the data store(s) 1806 can store and/or manage multiple user accounts, an example of which is described in relation to the user account 1810. In at least one example, the user account 1810 can include user account data 1834, which can include, but is not limited to, data associated with user identifying information (e.g., name, phone number, address, artist or band name, verified credentials, etc.), user identifier(s) (e.g., alphanumeric identifiers, etc.), user preferences (e.g., learned or user-specified), purchase history data (e.g., identifying one or more items purchased (and respective item information), subscription tier information, etc.), linked payment sources (e.g., bank account(s), stored balance(s), etc.), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, user service data, loyalty data (e.g., loyalty account numbers, rewards redeemed, rewards available, etc.), risk indicator(s) (e.g., level(s) of risk), etc.

In at least one example, the user account data 1834 can include account activity 1836 and user wallet key(s) 1838. In some examples, the user wallet key(s) 1838 can include a public-private key-pair and a respective address associated with the asset network or other asset networks. In some examples, the user wallet key(s) 1838 may include one or more key pairs, which can be unique to the asset network or other asset networks.

In addition to the user account data 1834, the user account 1810 can include ledger(s) for account(s) managed by the service provider system 1802, for the user. For example, the user account 1810 may include an asset ledger 1824, a fiat currency ledger 1826, and/or one or more other ledgers 1828. The ledger(s) can indicate that a corresponding user utilizes the service provider system 1802 to manage corresponding accounts (e.g., a cryptocurrency account, a securities account, a fiat currency account, an artist account, etc.). It should be noted that in some examples, the ledger(s) can be logical ledger(s) and the data can be represented in a single database. In some examples, individual ones of the ledger(s), or portions thereof, can be maintained by the service provider system 1802.

In some examples, the asset ledger 1824 can store a balance for each of one or more cryptocurrencies (e.g., Bitcoin, Ethereum, Litecoin, etc.) registered to the user account 1810. In at least one example, the asset ledger 1824 can further record transactions of cryptocurrency assets associated with the user account 1810. For example, the user account 1810 can receive cryptocurrency from the asset network using the user wallet key(s) 1838. In some examples, the user wallet key(s) 1838 may be generated for the user upon request. User wallet key(s) 1838 can be requested by the user in order to send, exchange, or otherwise control the balance of cryptocurrency held by the service provider system 1802 (e.g., in the asset wallet 1822) and registered to the user. In some examples, the user wallet key(s) 1838 may not be generated until a user account requires such. This on-the-fly wallet key generation provides enhanced security features for users, reducing the number of access points to a user account's balance and, therefore, limiting exposure to external threats.

Each account ledger can reflect a positive balance when funds are added to the corresponding account. An account can be funded by transferring currency in the form associated with the account from an external account (e.g., transferring a value of cryptocurrency to the service provider system 1802 and the value is credited as a balance in asset ledger 1824), by purchasing currency in the form associated with the account using currency in a different form (e.g., buying a value of cryptocurrency from the service provider system 1802 using a value of fiat currency reflected in fiat currency ledger 1826, and crediting the value of cryptocurrency in asset ledger 1824), or by conducting a transaction with another user (customer or merchant) of the service provider system 1802 wherein the account receives incoming currency (which can be in the form associated with the account or a different form, in which the incoming currency may be converted to the form associated with the account).

With specific reference to funding a cryptocurrency account, a user may have a balance of cryptocurrency stored in another cryptocurrency wallet. In some examples, the other cryptocurrency wallet can be associated with a third-party unrelated to the service provider system 1802 (i.e., an external account). Such a transaction can request that the user to transfer an amount of the cryptocurrency in a message signed by user's private key to an address provided by the service provider system 1802. In at least one example, the transaction can be sent to miners to bundle the transaction into a block of transactions and to verify the authenticity of the transactions in the block. Once a miner has verified the block, the block is written to the public blockchain 1814 where the service provider system 1802 can then verify that the transaction has been confirmed and can credit the user's asset ledger 1824 with the transferred amount. When an account is funded by transferring cryptocurrency from a third-party cryptocurrency wallet, an update can be made to the public blockchain 1814. In some cases, this update of the public blockchain 1814 need not take place at a time-critical moment, such as when a transaction is being processed by a merchant in store or online.

In some examples, a user can purchase cryptocurrency to fund their cryptocurrency account. In some examples, the user can purchase cryptocurrency through services offered by the service provider system 1802. As described above, in some examples, the service provider system 1802 can acquire cryptocurrency from a third-party source. In examples where the service provider system 1802 has its own cryptocurrency assets, cryptocurrency transferred in a transaction (e.g., data with address provided for receipt of transaction and a balance of cryptocurrency transferred in the transaction) can be stored in an asset wallet 1822 associated with the service provider system 1802. In at least one example, the service provider system 1802 can credit the asset ledger 1824 of the user. Additionally, while the service provider system 1802 recognizes that the user retains the value of the transferred cryptocurrency through crediting the asset ledger 1824, an inspection of the blockchain will show the cryptocurrency as having been transferred to the service provider system 1802. In some examples, the asset wallet 1822 can be associated with many different addresses. In such examples, an inspection of the blockchain may not necessarily associate all cryptocurrency stored in asset wallet 1822 as belonging to the same entity. The presence of a private ledger used for real-time transactions and maintained by the service provider system 1802, combined with updates to the public ledger at other times, allows for extremely fast transactions using cryptocurrency to be achieved. In some examples, the "private ledger" can refer to the asset ledger 1824, which in some examples, can utilize the private blockchain 1832, as described herein. The "public ledger" can correspond to the public blockchain 1814 associated with the asset network.

In at least one example, an asset ledger 1824, fiat currency ledger 1826, or the like associated with the user account 1810 can be credited when conducting a transaction with another user (customer or merchant) wherein the user receives incoming currency. In some examples, a user can receive cryptocurrency in the form of payment for a transaction with another user. In at least one example, such cryptocurrency can be used to fund the asset ledger 1824. In some examples, a user can receive fiat currency or another currency in the form of payment for a transaction with another user. In at least one example, at least a portion of such funds can be converted into cryptocurrency by the service provider system 1802 and used to fund the asset ledger 1824 of the user.

In examples, a user can also have an account in U.S. dollars, which can be tracked, for example, via the fiat currency ledger 1826. Such an account can be funded by transferring money from a bank account at a third-party bank to an account maintained by the service provider system 1802 as is conventionally known. In some examples, a user can receive fiat currency in the form of payment for a transaction with another user. In such examples, at least a portion of such funds can be used to fund the fiat currency ledger 1826.

In some examples, a user can have one or more internal payment cards registered with the service provider system 1802. Internal payment cards can be linked to one or more of the accounts associated with the user account 1810. In some embodiments, options with respect to internal payment cards can be adjusted and managed using an application (e.g., the payment application 1726, a wallet application 1812, etc.).

In at least one example, the user account 1810 can be associated with the asset wallet accessible via a wallet application 1812 of the user device 1804, or a stored balance for use in payment transactions, peer-to-peer transactions, payroll payments, etc. In at least one example, the asset wallet 1822 can store data indicating an address provided for receipt of a cryptocurrency transaction. In at least one example, the balance of the asset wallet 1822 can be based at least in part on a balance of the asset ledger 1824. In at least one example, funds availed via the asset wallet 1822 can be stored in the asset wallet 1822. Funds availed via the asset wallet 1822 can be tracked via the asset ledger 1824. The asset wallet 1822, however, can be associated with additional cryptocurrency funds.

In at least one example, when the service provider system 1802 includes a private blockchain 1832 for recording and validating cryptocurrency transactions, the asset wallet 1822 can be used instead of, or in addition to, the asset ledger 1824. For example, a merchant can provide the address of the asset wallet 1822 for receiving payments. In an example where a customer is paying in cryptocurrency and the customer has their own cryptocurrency wallet account associated with the service provider system 1802, the customer can send a message signed by its private key including its wallet address (i.e., of the customer) and identifying the cryptocurrency and value to be transferred to the merchant's asset wallet 1822. The service provider system 1802 can complete the transaction by reducing the cryptocurrency balance in the customer's cryptocurrency wallet and increasing the cryptocurrency balance in the merchant's asset wallet 1822. In addition to recording the transaction in the respective cryptocurrency wallets, the transaction can be recorded in the private blockchain 1832 and the transaction can be confirmed. A user can perform a similar transaction with cryptocurrency in a peer-to-peer transaction as described above.

While the asset ledger 1824 and/or asset wallet 1822 are each described above with reference to cryptocurrency, the asset ledger 1824 and/or asset wallet 1822 can alternatively be used in association with securities. In some examples, different ledgers and/or wallets can be used for different types of assets. That is, in some examples, a user can have multiple asset ledgers and/or asset wallets for tracking cryptocurrency, securities, or the like.

It should be noted that user(s) having accounts managed by the service provider system 1802 is an aspect of the technology disclosed that enables technical advantages of increased processing speed and improved security.

The description of the environment 1800 above generally relates to a centralized service provider that at least partially facilitates storing and managing assets in the data store 1806. However, the environment 1800 may also facilitate decentralized storage and management of assets alternatively or in addition to centralized storage and management as described above. For instance, the environment 1800 may include a decentralized platform implemented using a plurality of nodes (e.g., web nodes), an example of which is illustrated as node 1816. The node 1816 is representative of a computer or other device tasked with validating transactions and/or maintaining a copy of a blockchain ledger, such as a ledger associated with the public blockchain 1814. The decentralized platform may be implemented via the environment 1800 through use of decentralized identifiers and verifiable credentials that are stored and managed by user devices 1804. A decentralized identifier is configured as a self-owned identifier that supports decentralized authentication and routing. A self-owned identifier in a blockchain network is a unique identifier that is owned and controlled by an individual entity on the blockchain, as contrasted with an entity controlled by a centralized authority (e.g., the service provider system 1802). The decentralized identity referenced by a decentralized identifier gives an entity control over what data can be accessed, stored, modified, and so forth by other entities, such as the service provider system 1802.

The node 1816, as representative of one of a plurality of decentralized nodes (e.g., decentralized web nodes), supports data storage and relays that allows entities, service provider systems, individuals, organizations and so forth to send, store, and receive encrypted or public messages and data. The node 1816 is universally addressable and is "crawlable" using data addressing in relation to the decentralized identifiers. The node 1816 is also configured to support decentralized replication of data across the nodes that is consistent across multiple nodes over time through continued data communication between the nodes in the decentralized platform. The node 1816 is configurable to support secure encryption through use of a cryptographic key associated with an individual's decentralized identifier and support semantic discovery to discover different forms of published data.

Verifiable credentials are an open standard for digital credentials, and employ a data format for cryptographic presentation and verification of claims. A verifiable credential represents an indication of trust of a piece of information related to an entity. For example, a verifiable credential indicates that the issuer of the verifiable credential trusts the holder of the verifiable credential; the holder trusts a verifier of the verifiable credential; and that the verifier trusts the issuer. Verifiable credentials may be issued by anyone, about anything, and can be presented to and verified by everyone granted access to the verifiable credential. Accordingly, a user of the user device 1804 may be an issuer, a holder, and/or a verifier, as can the service provider system 1802.

In some examples, the user device 1804 may implement a wallet application 1812 configured to manage decentralized identifiers and/or verifiable credentials. For instance, the wallet application 1812 may provide a user interface for implementation of access controls to various data associated with the decentralized identifier by the service provider system 1802, to other user devices, and so forth. Additionally, the wallet application 1812 may be configured to provide functionality for resource transfers (e.g., cryptocurrency, fiat currency, etc.) with the service provider system 1802, other user devices, and the like, based on techniques described herein.

In some examples, the hardware wallet 1818 may store cryptocurrency assets in combination with the wallet application 1812 and the service provider system 1802. For instance, the hardware wallet 1818, the wallet application 1812, and the service provider system 1802 may each store a respective, different private key, where a transaction with the cryptocurrency assets is signed by at least two of the three private keys. The user interface provided by the wallet application 1812 may allow a user to request a transaction. The wallet application 1812 may then sign the transaction with the private key of the wallet application 1812, have either the hardware wallet 1818 or the service provider system 1802 use a second of the three private keys to sign the transaction, and then provide the transaction with two signatures to the public blockchain 1814 for processing.

FIG. 19 depicts an illustrative block diagram illustrating a system 1900 for performing techniques described herein. The system 1900 includes a user device 1902, that communicates with server computing device(s) (e.g., server(s) 1904) via network(s) 1906 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1902 is illustrated, in additional or alternate examples, the system 1900 can have multiple user devices, as described above with reference to FIG. 17 and as shown for the system 102 and the client device 104 of FIG. 1.

In at least one example, the user device 1902 can be any suitable type of computing device, e.g., portable, semi-portable, semi-stationary, or stationary. Some examples of the user device 1902 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, a speaker device, an automobile or other vehicle type, an Internet of Things (IoT) device, etc. That is, the user device 1902 can be any computing device capable of sending communications and performing the functions according to the techniques described herein. The user device 1902 can include devices, e.g., payment card readers, or components capable of accepting payments, as described below. The user device 1902 may be representative of, and provide functionality for, the user devices 1706 described in relation to FIG. 17.

In the illustrated example, the user device 1902 includes one or more processors 1908, one or more computer-readable media 1910, one or more communication interface(s) 1912, one or more input/output (I/O) devices 1914, a display 1916, and sensor(s) 1918. The user device 1902 is also configurable to include one or more encoders and one or more decoders.

In at least one example, each processor 1908 can itself comprise one or more processors or processing cores. For example, the processor(s) 1908 can be implemented as one or more microprocessors, microcomputers, microcontrollers, digital signal processors, central processing units, state machines, logic circuitries, and/or any devices that manipula the signals based on operational instructions. In some examples, the processor(s) 1908 can be one or more hardware processors and/or logic circuits of any suitable type specifically programmed or configured to execute the algorithms and processes described herein. The processor(s) 1908 can be configured to fetch and execute computer-readable processor-executable instructions stored in the computer-readable media 1910.

Depending on the configuration of the user device 1902, the computer-readable media 1910 can be an example of tangible non-transitory computer storage media and can include volatile and nonvolatile memory and/or removable and non-removable media implemented in any type of technology for storage of information such as computer-readable processor-executable instructions, data structures, program components or other data. The computer-readable media 1910 can include, but is not limited to, RAM, ROM, EEPROM, flash memory, solid-state storage, magnetic disk storage, optical storage, and/or other computer-readable media technology. Further, in some examples, the user device 1902 can access external storage, such as RAID storage systems, storage arrays, network attached storage, storage area networks, cloud storage, or any other medium that can be used to store information and that can be accessed by the processor(s) 1908 directly or through another computing device or network. Accordingly, the computer-readable media 1910 can be computer storage media able to store instructions, components or components that can be executed by the processor(s) 1908. Further, when mentioned, non-transitory computer-readable media exclude media such as energy, carrier signals, electromagnetic waves, and signals per se.

The computer-readable media 1910 can be used to store and maintain any number of functional components that are executable by the processor(s) 1908. In some implementations, these functional components comprise instructions or programs that are executable by the processor(s) 1908 and that, when executed, implement operational logic for performing the actions and services attributed above to the user device 1902. Functional components stored in the computer-readable media 1910 can include a user interface 1920 to enable users to interact with the user device 1902, and thus the server(s) 1904 and/or other networked devices. and at least one example, a user can interact with the user interface via touch input, spoken input, gesture, or any other type of input. The word "input" is also used to describe "contextual" input that may not be directly provided by the user via the user interface 1920 as shown in FIGS. 14 and 15. For example, user's interactions with the user interface 1920 are analyzed using, e.g., natural language processing techniques, user movement tracking techniques, eye tracking techniques, etc. to determine context or intent of the user, which may be treated in a manner similar to "direct" user input.

Depending on the type of the user device 1902, the computer-readable media 1910 can also optionally include other functional components and data, such as other components and data 1922, which can include programs, drivers, etc., and the data used or generated by the functional components. In addition, the computer-readable media 1910 can also store data, data structures and the like, that are used by the functional components. Further, the user device 1902 can include many other logical, programmatic and physical components, of which those described are merely examples that are related to the discussion herein.

In at least one example, the computer-readable media 1910 can include additional functional components, such as an operating system 1924 for controlling and managing various functions of the user device 1902 and for enabling user interactions.

The communication interface(s) 1912 can include one or more interfaces and hardware components for enabling communication with various other devices, such as over the network(s) 1906 or directly. For example, communication interface(s) 1912 can enable communication through one or more network(s) 1906, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1906 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1902 can further include one or more input/output (I/O) devices 1914. The I/O devices 1914 can include speakers, a microphone, a camera, and various user controls (e.g., buttons, a joystick, a keyboard, a keypad, etc.), a haptic output device, and so forth. The I/O devices 1914 can also include attachments that leverage the accessories (audio-jack, USB-C, Bluetooth, etc.) to connect with the user device 1902.

In at least one example, user device 1902 can include a display 1916. Depending on the type of computing device(s) used as the user device 1902, the display 1916 can employ any suitable display technology. For example, the display 1916 can be a liquid crystal display, a plasma display, a light emitting diode display, an OLED (organic light-emitting diode) display, an electronic paper display, or any other suitable type of display able to present digital content thereon. In at least one example, the display 1916 can be an augmented reality display, a virtual reality display, or any other display able to present and/or project digital content. In some examples, the display 1916 can have a touch sensor associated with the display 1916 to provide a touchscreen display configured to receive touch inputs for enabling interaction with a graphic interface presented on the display 1916. Accordingly, implementations herein are not limited to any particular display technology. In some examples, the user device 1902 may not include the display 1916, and information can be presented by other means, such as aurally, haptically, etc.

In addition, the user device 1902 can include sensor(s) 1918. The sensor(s) 1918 can include a global positioning system ("GPS") device able to indicate location information. Further, the sensor(s) 1918 can include, but are not limited to, an accelerometer, gyroscope, compass, proximity sensor, camera, microphone, and/or a switch.

In some examples, the GPS device can be used to identify a location of a user. In at least one example, the location of the user can be used by the seller platform 1710, the P2P platform 1712, and/or the media content platform 1714, described above, to provide one or more services. That is, in some examples, the service provider can implement geofencing to provide particular services to users by the seller platform 1710, the P2P platform 1712, and/or the media content platform 1714.

In examples, the user device 1902 includes a codec system, which may comprise an encoder and/or a decoder. The encoder is configured to encode a data stream or signal from an analog signal (e.g., an analog audio signal, an analog video signal, etc.) to a digital signal for transmission or storage. The decoder is configured to convert the digital signal back to an analog signal, such as for playback or editing. In some cases, the encoder may be configured to encode the data stream or analog signal in an encrypted format, and the decoder may accordingly be configured to decrypt the digital signal as part of the decoding process (e.g., using a cryptographic key). Additionally, in some examples, the encoder may compress data to reduce transmission bandwidth and/or storage space for the digital signal. One example of a compression codec system is a lossless codec, in which the digital data stream is a compressed format of the original data stream, but retains the information present in the original data stream. Another example of a compression codec system is a lossy codec which reduces the quality of the digital data stream but can increase the compression of the data stream relative to lossless codec systems. The codec system comprising the encoder and/or the decoder may be specialized to accomplish various different objectives, such as to preserve motion, preserve color, minimize latency, maintain fidelity, minimize bit-rate, optimize for different output device types, maintain synchronization of audio and video (e.g., using a metadata synchronization data stream), and so on. Although not explicitly illustrated in the example system 1900, the server 1904 may include an encoder and/or a decoder as well.

Additionally, the user device 1902 can include various other components that are not shown, examples of which include removable storage, a power source, such as a battery and power control unit, a barcode scanner, a printer, a cash drawer, and so forth.

In addition, as described in relation to FIG. 17, the user device 1902 can include, be connectable to, or otherwise be coupled to a reader device 1926, for reading payment instruments and/or identifiers associated with payment objects. The reader device 1926 can include a read head for reading a magnetic strip of a payment card, and further can include encryption technology for encrypting the information read from the magnetic strip. Additionally or alternatively, the reader device 1926 can be an EMV payment reader, which in some examples, can be embedded in the user device 1902. Moreover, numerous other types of readers can be employed with the user device 1902 herein, depending on the type and configuration of the user device 1902.

The reader device 1926 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data from various types of payment instruments. Accordingly, the reader device 1926 may include hardware implementation, such as slots, magnetic tracks, and rails with one or more sensors or electrical contacts to facilitate detection and acceptance of a payment instrument. That is, the reader device 1926 may include hardware implementations to enable the reader device 1926 to interact with a payment instrument via a swipe, a dip, or a tap to obtain payment data associated with a customer. Additionally or optionally, the reader device 1926 may also include a biometric sensor to receive and process biometric characteristics and process them as payment instruments, given that such biometric characteristics are registered with the payment service and connected to a financial account with a bank server. The reader device 1926 may include processing unit(s), computer-readable media, a reader chip, a transaction chip, a timer, a clock, a network interface, a power supply, and so on. That is, the reader device 1926 may include any of the computing components described herein with reference to the user device 1902 to implement the functionality provided by the reader device 1926.

In examples, the reader device 1926 includes a reader chip, which may perform functionality to control the power supply, among other functionality of the reader device 1926. The power supply may include one or more power supplies such as a physical connection to AC power or a battery. Power supply may include power conversion circuitry for converting AC power and generating a plurality of DC voltages for use by components of reader device 1926. When power supply includes a battery, the battery may be charged via a physical power connection, via inductive charging, or via any other suitable method.

The reader device 1926 may also include a transaction chip that may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. The transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While the user device 1902, which can be a POS terminal, and the reader device 1926 are shown as separate devices, in additional or alternative examples, the user device 1902 and the reader device 1926 can be part of a single device, which may be a battery-operated device. In some examples, the reader device 1926 can have a display integrated therewith, which can be in addition to (or as an alternative of) the display 1916 associated with the user device 1902.

The server(s) 1904 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1904 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1904 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 1904 can include one or more processors 1928, one or more computer-readable media 1930, one or more I/O devices 1932, and one or more communication interfaces 1934. Each processor 1928 can be a single processing unit or a number of processing units and can include single or multiple computing units or multiple processing cores. The processor(s) 1928 can be implemented as one or more microprocessors, microcomputers, microcontrollers, digital signal processors, central processing units, state machines, logic circuitries, and/or any devices that manipulate signals based on operational instructions. For example, the processor(s) 1928 can be one or more hardware processors and/or logic circuits of any suitable type specifically programmed or configured to execute the algorithms and processes described herein. The processor(s) 1928 can be configured to fetch and execute computer-readable instructions stored in the computer-readable media 1930, which can program the processor(s) 1928 to perform the functions described herein.

The computer-readable media 1930 can include volatile and nonvolatile memory and/or removable and non-removable media implemented in any type of technology for storage of information, such as computer-readable instructions, data structures, program components, or other data. Such computer-readable media 1930 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1904, the computer-readable media 1930 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1930 can be used to store any number of functional components that are executable by the processor(s) 1928. In many implementations, these functional components comprise instructions or programs that are executable by the processors 1928 and that, when executed, specifically configure the one or more processors 1928 to perform the actions attributed above to the seller platform 1710, the P2P platform 1712, and/or the media content platform 1714. Functional components stored in the computer-readable media 1930 can optionally include a merchant component 1936, a training component 1938, and one or more other components and data 1940. The computer-readable media 1930 can additionally include an operating system 1942 for controlling and managing various functions of the server(s) 1904.

The merchant component 1936 can be configured to receive transaction data from POS systems, such as the POS system 1724 described above with reference to FIG. 17. The merchant component 1936 can transmit requests (e.g., authorization, capture, settlement, etc.) to payment service server computing device(s) to facilitate POS transactions between merchants and customers. The merchant component 1936 can communicate the successes or failures of the POS transactions to the POS systems.

The training component 1938 can be configured to train models using machine-learning mechanisms, as well as retrain the models to improve outputs provided by the models based on feedback received over time. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 1902 and/or the server(s) 1904 for use at a time after the data models have been trained (e.g., at runtime).

The one or more other components and data 1940 can include functionality of which is described above. Further, the one or more other components and data 1940 can include programs, drivers, etc., and the data used or generated by the functional components. Further, the server(s) 1904 can include many other logical, programmatic and physical components, of which those described above are merely examples that are related to the discussion herein.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Modules are typically functional such that they may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The communication interface(s) 1934 can include one or more interfaces and hardware components for enabling communication with various other devices, such as over the network(s) 1906 or directly. For example, communication interface(s) 1934 can enable communication through one or more network(s) 1906, which can include, but are not limited any type of network known in the art, as described herein.

The server(s) 1904 can further be equipped with various I/O devices 1932. Such I/O devices 1932 can include a display, various user interface controls (e.g., buttons, joystick, keyboard, mouse, touch screen, biometric or sensory input devices, etc.), audio speakers, connection ports and so forth.

In at least one example, the system 1900 can include a datastore 1944 that can be configured to store data that is accessible, manageable, and updatable. In some examples, the datastore 1944 can be integrated with the user device 1902 and/or the server(s) 1904. In other examples, as shown in FIG. 19, the datastore 1944 can be located remotely from the server(s) 1904 and can be accessible to the server(s) 1904. The datastore 1944 can comprise multiple databases and/or servers connected locally and/or remotely via the network(s) 1906. In at least one example, the datastore 1944 can store user profiles, which can include merchant profiles, customer profiles, artist profiles, and so on.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, media content consumption data (e.g., number of streams of media content and by which artists, direct artist payouts, playlists generated or "favorited," durations of listening and/or watching individual media content items, actions performed while consuming media content (e.g., skips, repeats, volume changes, etc.), locations at which media content is consumed, devices used to consume media content, activities during which media content is consumed, etc.), etc.

Artist profiles can store data including, but not limited to, artist information (e.g., artist's performance or stage name, band name, artist's legal name, record label, phone number, address, social media handles, website address, banking information, etc.), artist preferences (e.g., learned or artist-specified), media content (and/or associated data) at least partially attributed to the artist (e.g., songs, videos, artists in a same genre or having shared listeners, etc.), event data (e.g., tour dates, appearance dates, appointments, etc.), financial data (e.g., advance data, recoupment data, royalty data, payouts data, etc.), payroll data (e.g., employees, contractors, venues, payroll frequency, etc.), listening data (e.g., number of streams on media content platform(s), listening trends, etc.), fan data (number of followers on media content platform(s), number of followers on social media platform(s), etc.), reservations data (e.g., venue reservations, studio recording reservations, previous reservations, upcoming (scheduled) reservations, reservation duration, interactions associated with such reservations, etc.), inventory data (e.g., merchandise inventory), customer service data, and so forth.

Furthermore, in at least one example, the datastore 1944 can store inventory database(s) and/or catalog database(s). As described above, an inventory can store data associated with a quantity of each item that a merchant has available to the merchant. Furthermore, a catalog can store data associated with items that a merchant has available for acquisition. The datastore 1944 can store additional or alternative types of data as described herein.

The phrases "in some examples," "according to various examples," "in the examples shown," "in one example," "in other examples," "various examples," "some examples," and the like generally mean the particular feature, structure, or characteristic following the phrase is included in at least one example of the present invention and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to components described in the figures for convenience and ease of understanding. However, the methods illustrated are not limited to being performed using components described in the figures and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to components described in the figures for convenience and ease of understanding. However, the methods illustrated are not limited to being performed using components described the figures and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. A method comprising:
generating a plurality of digital content embeddings based on a plurality of digital content characteristics using machine learning;
indexing the plurality of digital content embeddings along with respective identifiers based on the plurality of digital content characteristics according to an embedding schema;
receiving a search result referencing a plurality of items, the receiving performed responsive to a search query;
generating a search result embedding based on the plurality of items referenced in the search result, the generating performed using machine learning;
generating one or more affinity scores by performing a nearest neighbor search based on nearness in an embedding space between the search result embedding and the plurality of digital content embeddings;
obtaining user interaction data based on the plurality of items in the search result;
adjusting the plurality of items in the search result based on the one or more affinity scores and the user interaction data; and
presenting the search result having the adjusted plurality of items for display in a user interface.

2. The method as described in claim 1, wherein the plurality of digital content characteristics include album, artist, track, and a user vector referencing a user associated with consumption of a respective item of digital content.

3. The method as described in claim 1, wherein the generating of the plurality of digital content embeddings is performed using collaborative filtering as part of the machine learning.

4. The method as described in claim 3, wherein the collaborative filtering includes alternating least squares.

5. The method as described in claim 1, wherein the generating of the plurality of digital content embeddings is based on at least one fine-tuning parameter.

6. The method as described in claim 5, wherein the at least one fine-tuning parameter includes a number of threads, size of data, or queue size.

7. The method as described in claim 1, wherein the indexing is based on a plurality of indexing templates.

8. The method as described in claim 1, wherein the user interaction data describes recency and position, respectively, of the plurality of items in the search result.

9. The method as described in claim 1, wherein the user interaction data describes engagement levels, respectively, with the plurality of items in the search result.

10. The method as described in claim 9, wherein the user interaction data further describes a ratio based on a respective count of user interactions with a respective item of digital content and a total number of the user interactions.

11. A computing device comprising:
a processing device; and
a non-transitory computer-readable storage medium coupled to the processing device and storing instructions that, responsive to execution by the processing device, causes the processing device to perform operations including:
receiving a search result referencing a plurality of items;
generating a search result embedding based on one or more items referenced in the search result;
generating one or more affinity scores by performing a nearest neighbor search based on nearness in an embedding space between the search result embedding and a plurality of digital content embeddings, the plurality of digital content embeddings based on a plurality of digital content characteristics;
adjusting the plurality of items in the search result based on the one or more affinity scores; and
presenting the search result having the adjusted plurality of items for display in a user interface.

12. The computing device as described in claim 11, wherein the adjusting is further based on user interaction data describing user interactions, respectively, with a plurality of digital content items corresponding to the plurality of digital content embeddings.

13. The computing device as described in claim 12, wherein the user interaction data further describes engagement levels, respectively, with the plurality of items in the search result.

14. The computing device as described in claim 12, wherein the user interaction data further describes a ratio based on a respective count of the user interactions with a respective item of digital content and a total number of the user interactions.

15. The computing device as described in claim 11, wherein the plurality of digital content characteristics include album, artist, track, and a user vector referencing a user associated with consumption of a respective item of digital content.

16. The computing device as described in claim 11, wherein the plurality of digital content embeddings are generated using collaborative filtering as part of machine learning.

17. One or more non-transitory computer-readable storage media storing instructions that, responsive to execution by a processing device, cause the processing device to perform operations comprising:
generating a plurality of digital content embeddings based on a plurality of digital content characteristics by machine learning using collaborative filtering;
receiving a search result referencing a plurality of items;
generating a search result embedding based on the plurality of items referenced in the search result, the generating performed using machine learning;

generating one or more affinity scores by performing a nearest neighbor based on nearness in an embedding space between the search result embedding and the plurality of digital content embeddings; and adjusting the plurality of items in the search result based on the one or more affinity scores.

18. The one or more non-transitory computer-readable storage media as described in claim 17, wherein:

the adjusting is further based on user interaction data describing user interaction, respectively, with a plurality of digital content items corresponding to the plurality of digital content embeddings; and the user interaction data further describes engagement levels, respectively, with the plurality of items in the search result or a ratio based on a respective count of the user interactions with a respective item of digital content and a total number of the user interactions.

19. The one or more non-transitory computer-readable storage media as described in claim 17, wherein the generating of the plurality of digital content embeddings is based on at least one fine-tuning parameter and the at least one fine-tuning parameter includes a number of threads, size of data, or queue size.

20. The one or more non-transitory computer-readable storage media as described in claim 17, wherein the plurality of digital content characteristics include album, artist, track, and a user vector referencing a user associated with consumption of a respective item of digital content.

\* \* \* \* \*